(12) United States Patent
Okubo

(10) Patent No.: US 9,025,882 B2
(45) Date of Patent: May 5, 2015

(54) INFORMATION PROCESSING APPARATUS AND METHOD OF PROCESSING INFORMATION, STORAGE MEDIUM AND PROGRAM

(75) Inventor: Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 13/478,445

(22) Filed: May 23, 2012

(65) Prior Publication Data

US 2012/0308141 A1 Dec. 6, 2012

(30) Foreign Application Priority Data

Jun. 1, 2011 (JP) .................................. 2011-123370

(51) Int. Cl.
| | | |
|---|---|---|
| G06K 9/00 | (2006.01) | |
| G06K 9/46 | (2006.01) | |
| G06K 9/66 | (2006.01) | |
| G06K 9/62 | (2006.01) | |

(52) U.S. Cl.
CPC .......... *G06K 9/6298* (2013.01); *G06K 9/00288* (2013.01)

(58) Field of Classification Search
None
See application file for complete search history.

(56) References Cited

U.S. PATENT DOCUMENTS

| 6,628,811 | B1 * | 9/2003 | Nagao et al. ................... 382/118 |
|---|---|---|---|
| 8,379,937 | B1 * | 2/2013 | Moon et al. .................... 382/118 |
| 8,553,984 | B2 * | 10/2013 | Slotine et al. ................. 382/192 |
| 2003/0161504 | A1 * | 8/2003 | Inoue ............................. 382/115 |
| 2006/0198554 | A1 * | 9/2006 | Porter et al. ................... 382/159 |
| 2007/0172099 | A1 * | 7/2007 | Park et al. ...................... 382/118 |
| 2009/0034791 | A1 * | 2/2009 | Doretto et al. ................ 382/103 |
| 2009/0087041 | A1 * | 4/2009 | Hasebe et al. ................. 382/118 |
| 2009/0180671 | A1 * | 7/2009 | Lee et al. ....................... 382/118 |
| 2009/0190834 | A1 * | 7/2009 | Inoue ............................. 382/181 |
| 2010/0054550 | A1 * | 3/2010 | Okada ............................ 382/118 |
| 2010/0177206 | A1 * | 7/2010 | Ogawa ........................ 348/222.1 |
| 2011/0135167 | A1 * | 6/2011 | Imaoka .......................... 382/118 |

FOREIGN PATENT DOCUMENTS

JP 2006178651 A * 7/2006

* cited by examiner

*Primary Examiner* — Stephen R Koziol
*Assistant Examiner* — Jonathan S Lee
(74) *Attorney, Agent, or Firm* — Sony Corporation

(57) ABSTRACT

There is provided an information processing apparatus including a statistical quantity extraction section calculating similarities between all of a group of multiple images of a first identification target and all of a group of multiple images of a second identification target and extracting a statistical quantity for similarity from the similarities and an identification section identifying the first identification target with the second identification target based on the statistical quantity for similarity. The present technology may be applied to a personal computer, for example.

13 Claims, 26 Drawing Sheets

FIG.21
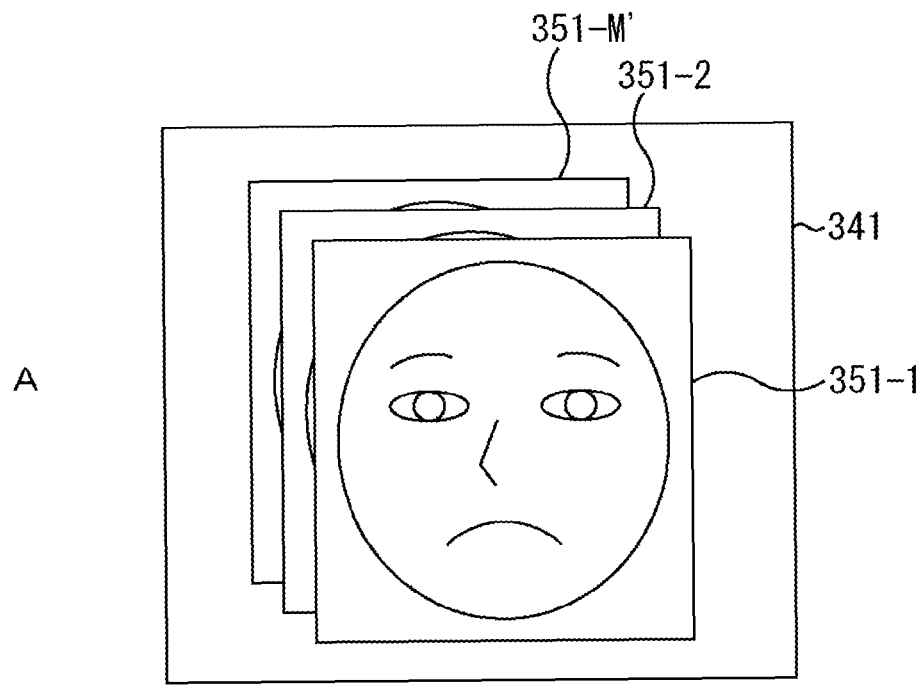
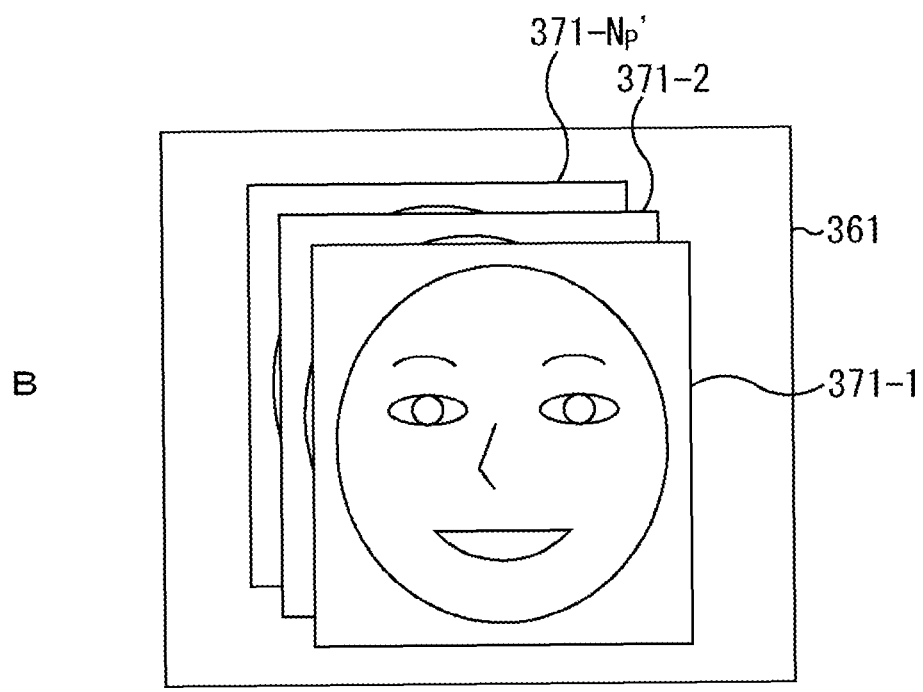

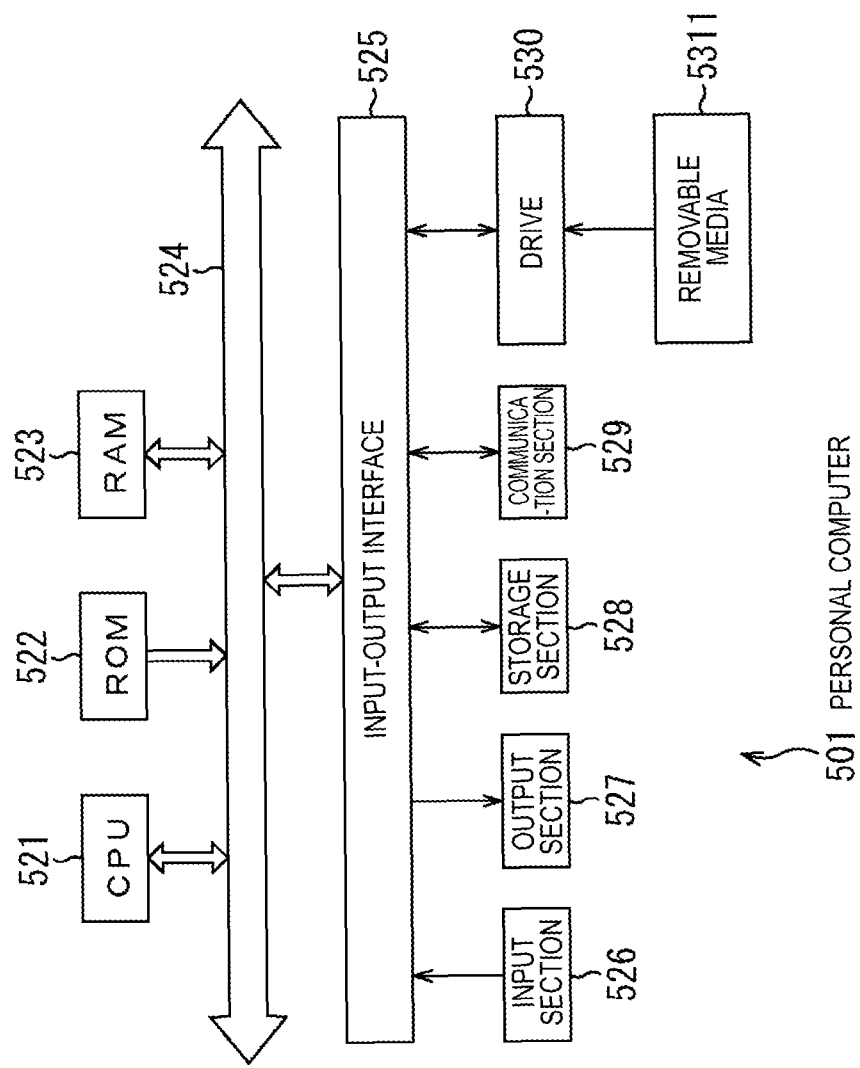

INFORMATION PROCESSING APPARATUS AND METHOD OF PROCESSING INFORMATION, STORAGE MEDIUM AND PROGRAM

CROSS-REFERENCE TO RELATED APPLICATION

The present application claims priority from Japanese Patent Application No. JP 2011-123370 filed in the Japanese Patent Office on Jun. 1, 2011, the entire content of which is incorporated herein by reference.

BACKGROUND

The present technology relates to an information processing apparatus and a method of processing information, a storage medium and a program, in particular, to an information processing apparatus and a method of processing information, a storage medium and a program, which improve identification accuracy.

A technology for identifying whether a recognition target person is the identical person from a face image of the recognition target person is disclosed (See Japanese Patent Laid-Open No. 2006-178651).

In the technology disclosed in Japanese Patent Laid-Open No. 2006-178651, a plurality of recognition parts acquire face images of a person and extract feature patterns from the acquired face images, and calculate similarities between the extracted feature patterns and a previously registered dictionary pattern.

Then, a statistical quantity corresponding to a plurality of similarities each calculated by each recognition part is calculated and the person is identified.

SUMMARY

However, in the technology disclosed in Japanese Patent Laid-Open No. 2006-178651, identification accuracy is likely to be insufficient because the feature patterns of the face images acquired by the face recognition parts and the previously registered dictionary pattern are compared one-to-one and the similarities are calculated.

Accordingly, there is a limit to identification accuracy because the statistical quantity is calculated from the similarities having insufficient accuracy and the person is identified based on this statistical quantity.

The present technology is provided in view of the above-describe situation and can improve the identification accuracy.

According to an aspect of the present technology, there is provided an information processing apparatus which includes a statistical quantity extraction section calculating similarities between all of a group of multiple images of a first identification target and all of a group of multiple images of a second identification target and extracting a statistical quantity for similarity from the similarities, and an identification section identifying the first identification target with the second identification target based on the statistical quantity for similarity.

The information processing apparatus may further include a feature quantity extraction section extracting local feature quantities from the images of the first identification target and the second identification target, and the statistical quantity extraction section may calculate the similarities based on the local feature quantities of the first identification target and the second identification target extracted by the feature quantity extraction section.

The identification section may identify the first identification target with the second identification target by determining whether the statistical quantity for similarity of each combination of the first identification target and the second identification target is equal to or higher than a corresponding predetermined threshold value and by integrating the determination results.

The statistical quantity extraction section may extract a histogram as the statistical quantity for similarity.

The statistical quantity extraction section may extract an average value as the statistical quantity for similarity.

One of the first identification target and the second identification target may be detected from one image previously registered.

According to an aspect of the present technology, there is provided a method of processing information including: calculating similarities between all of a group of multiple images of a first identification target and all of a group of multiple images of a second identification target and extracting a statistical quantity for similarity from the similarities; and identifying the first identification target with the second identification target based on the statistical quantity for similarity.

According to an aspect of the present technology, there is provided a computer readable storage medium storing a program which causes a computer to calculate similarities between all of a group of multiple images of a first identification target and all of a group of multiple images of a second identification target and extract a statistical quantity for similarity from the similarities, and to identify the first identification target with the second identification target based on the statistical quantity for similarity.

According to an aspect of the present technology, there is provided a program which causes a computer to calculate similarities between all of a group of multiple images of a first identification target and all of a group of multiple images of a second identification target and extract a statistical quantity for similarity from the similarities, and to identify the first identification target with the second identification target based on the statistical quantity for similarity.

According to an aspect of the present technology, identification accuracy may be improved.

BRIEF DESCRIPTION OF THE DRAWINGS

FIGS. 21A and 21B are diagrams illustrating examples of face image groups, FIG. 26 is a block diagram illustrating a hardware configuration of a personal computer to which an embodiment of the present technology is applied.

DETAILED DESCRIPTION OF THE EMBODIMENTS

Figure 1:
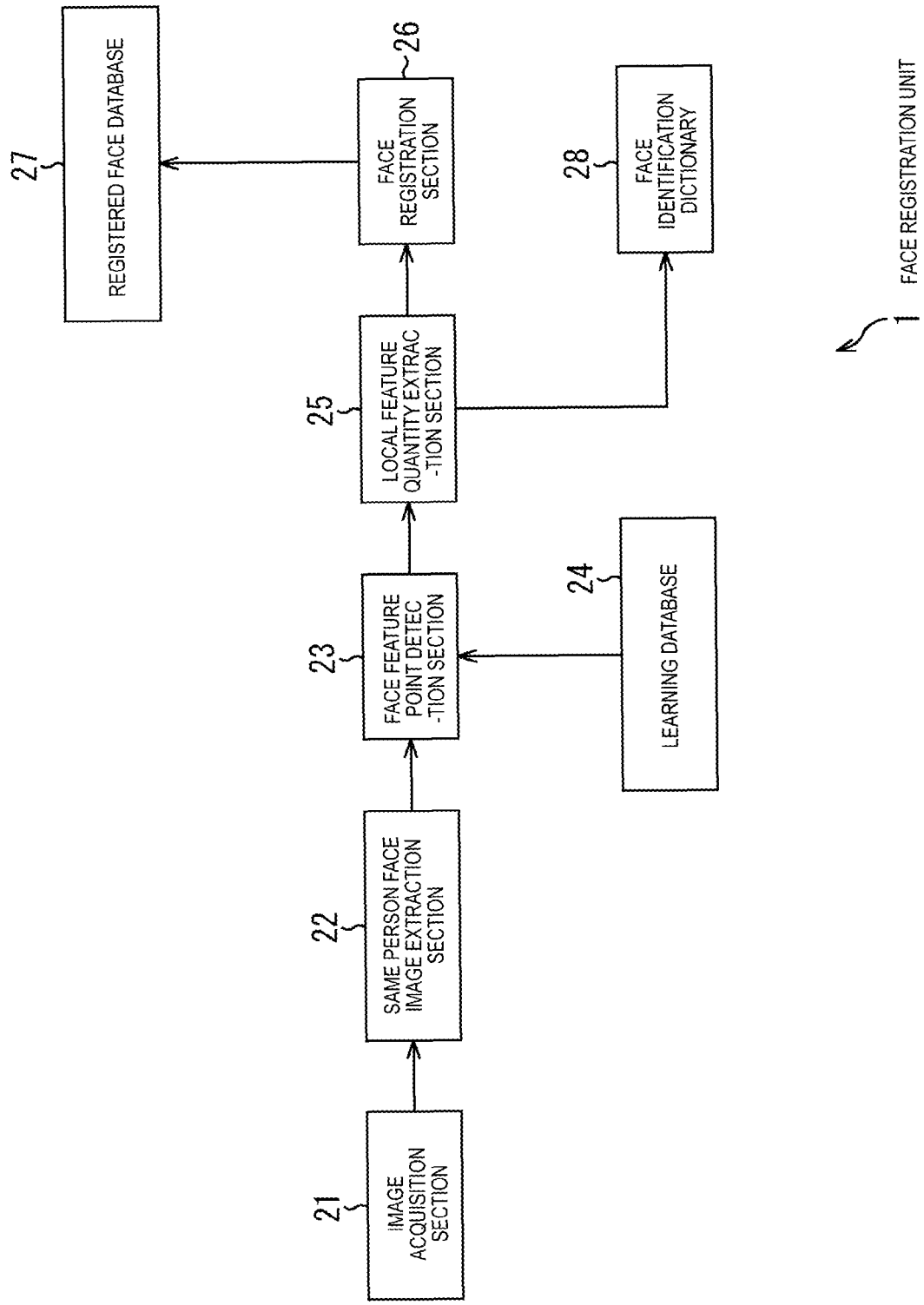
FIG. 1 is a block diagram illustrating a configuration of a face registration unit.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Modes implementing embodiments of the present technology (hereinafter referred to as embodiments) will be described below. The embodiments will be described in the following order.

<1> First Embodiment
  1. Configuration of Face Registration Unit
  2. Target registration processing 1
  3. Feature Point Detection Processing
  4. Feature Quantity Extraction Processing 1
  5. Face Registration Processing
  6. Configuration of Face Registration Unit
  7. Target Registration Processing 2
<2> Second Embodiment
  8. Configuration of Recognizer Creation Unit
  9. Face Identification Dictionary Creation Processing
  10. Feature Quantity Extraction Processing 2
  11. Statistical Quantity Extraction Processing
  12. Recognizer Creation Processing
<3> Third Embodiment
  13. Configuration of Face Identification Unit Configuration
  14. Target Identification Processing 1
  15. Face Identification Processing
  16. Configuration of Face Identification Unit
  17. Target Identification Processing 2
  18. Configuration of Personal Computer
  19. Others First Embodiment Configuration of Face Registration Unit FIG. 1 is a block diagram illustrating a configuration of a face registration unit 1.

The face registration unit 1 includes an image acquisition section 21, a same person face image extraction section 22, a face feature point detection section 23, a learning database 24, a local feature quantity extraction section 25, a face registration section 26, a registered face database 27 and a face identification dictionary 28.

The image acquisition section 21 acquires images and information related to the images input by a user and outputs the input images and information to the same person face image extraction section 22. The same person face image extraction section 22 extracts face images of the same person from each of the acquired plurality of images, and outputs the extracted face images to the face feature point detection section 23.

The face feature point detection section 23 detects feature points from the images based on the learning data previously stored in the learning database 24. The face feature point detection section 23 will be described in detail with reference to FIG. 2.

Figure 2:
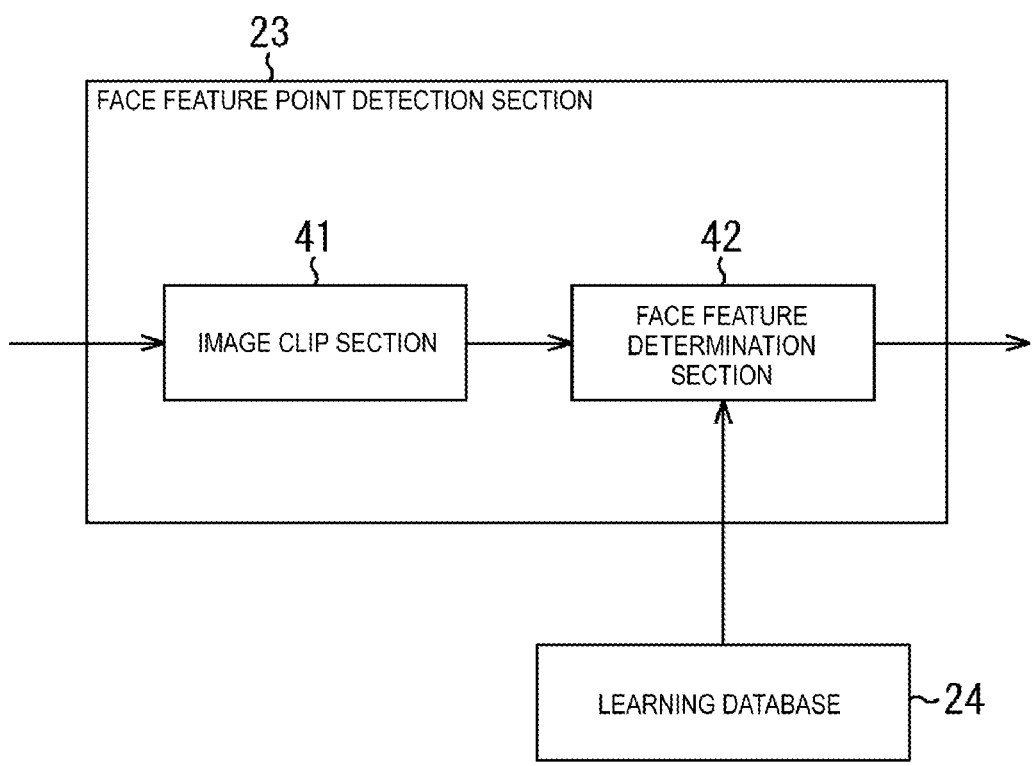
FIG. 2 is a block diagram illustrating a configuration of a face feature point detection section.

FIG. 2 is a block diagram illustrating a configuration of the face feature point detection section 23. The face feature point detection section 23 includes an image clip section 41 and a face feature determination section 42.

The image clip section 41 creates various clipped images from the acquired images and output the created clipped images to the face feature determination section 42. The face feature determination section 42 determines face features based on the created clipped images and the learning data and detects feature points.

Referring to FIG. 1 again, the local feature quantity extraction section 25 extracts a feature quantity of each detected feature point, that is, a local feature quantity. The local feature quantity extraction section 25 will be described in detail with reference to FIG. 3.

Figure 3:
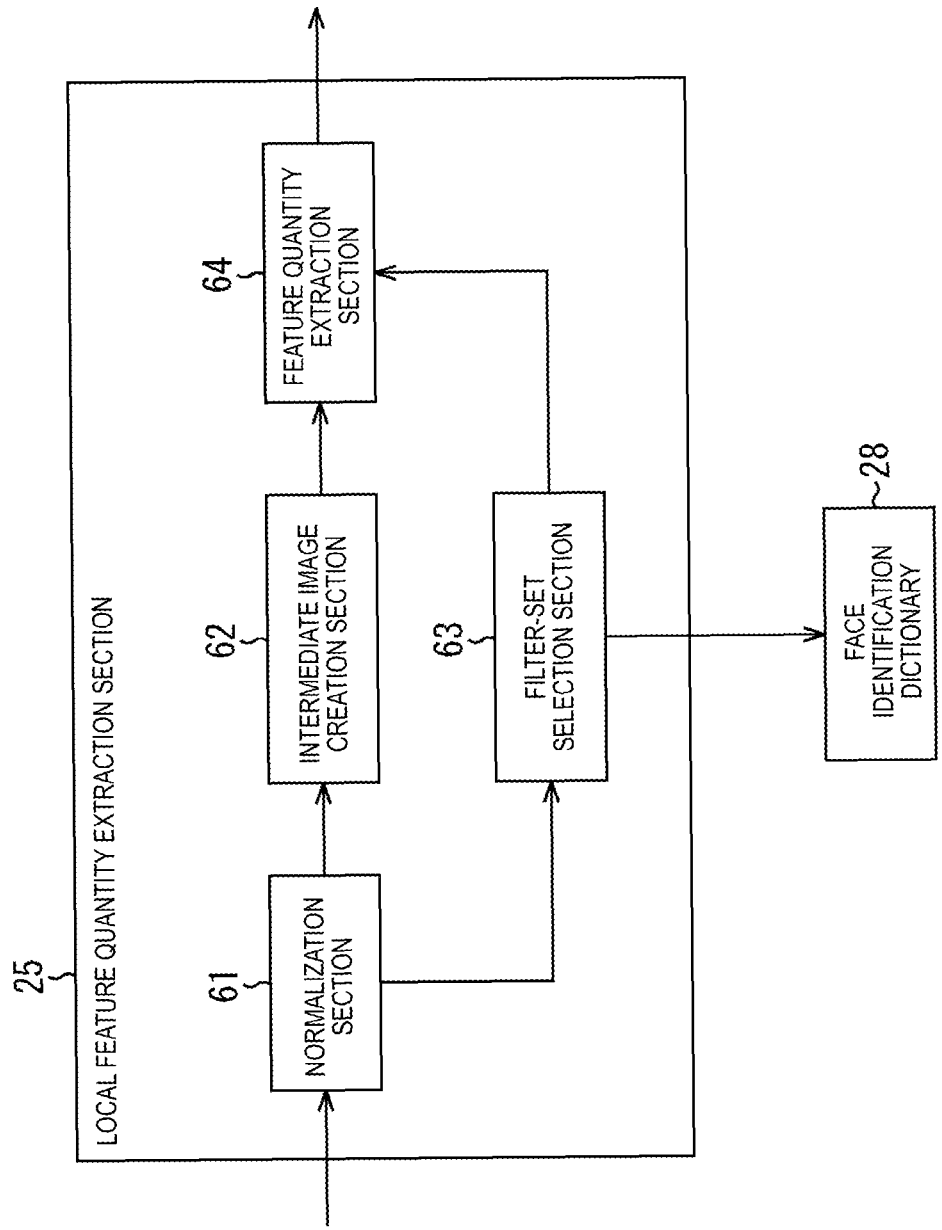
FIG. 3 is a block diagram illustrating a configuration of a local feature quantity extraction section.

FIG. 3 is a block diagram illustrating a configuration of the local feature quantity extraction section 25. The local feature quantity extraction section 25 includes a normalization section 61, an intermediate image creation section 62, a filter-set selection section 63 and a feature quantity extraction section 64.

The normalization section 61 normalizes the acquired image and outputs the normalized image to the intermediate image creation section 62 and the filter-set selection section 63. The intermediate image creation section 62 creates an integral image from the acquired image as an intermediate image and outputs the integral image to the feature quantity extraction section 64.

The filter-set selection section 63 selects a feature point and a feature extraction filter, stores the selected feature point in relation to the selected feature extraction filter in the face identification dictionary 28 and outputs the selected feature point and feature extraction filter to the feature quantity extraction section 64. The feature quantity extraction section 64 extracts a feature quantity based on the intermediate image and the filter-set.

Referring to FIG. 1 again, the face registration section 26 registers in the registered face database 27 the extracted feature quantity in relation to the person of the face to be registered.

[Target Registration Processing 1]

Figure 4:
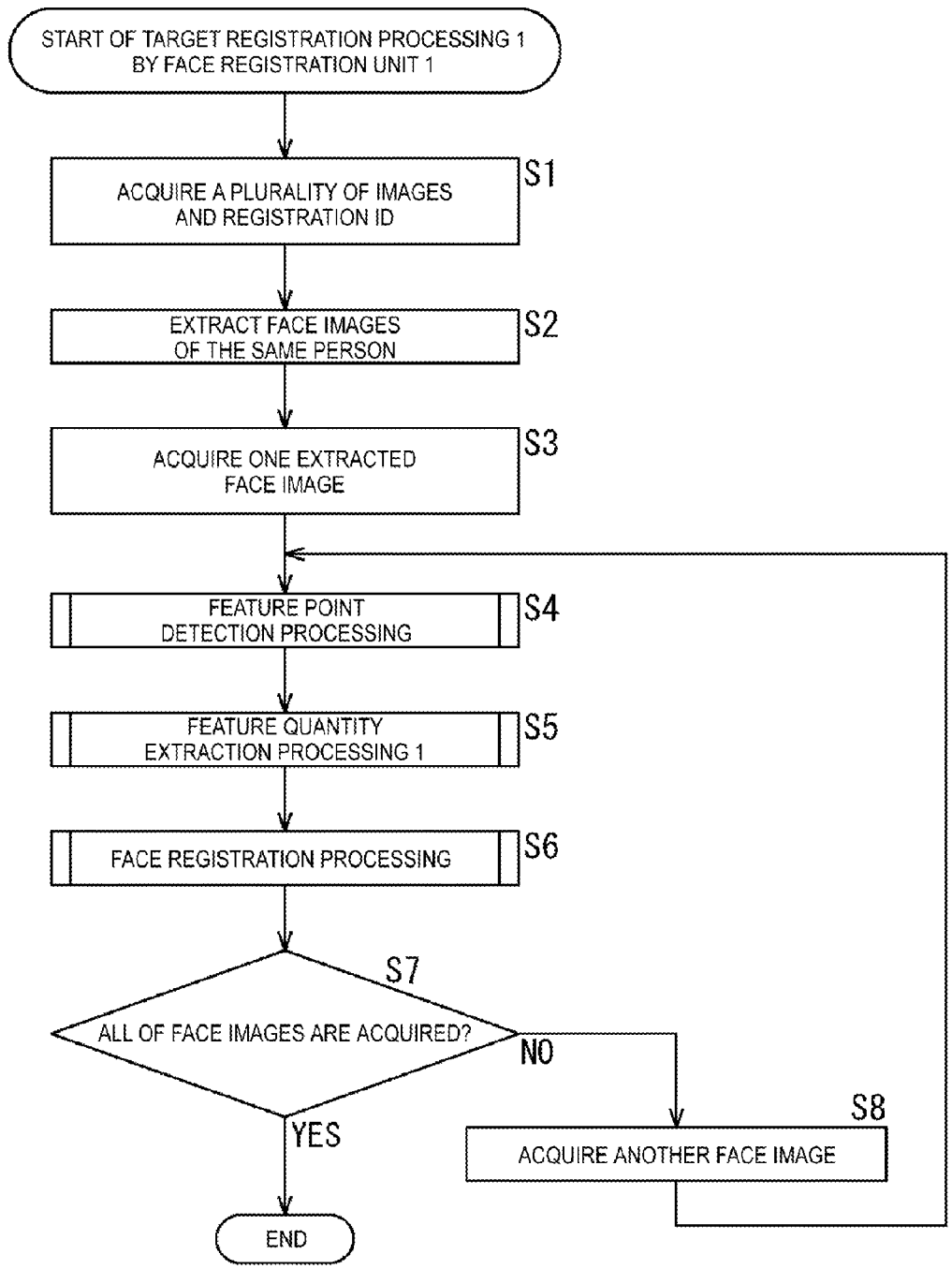
FIG. 4 is a flowchart explanatory of target registration processing.

The target registration processing 1 will be described with reference to FIG. 4 through FIG. 9. FIG. 4 is a flowchart explanatory of the target registration processing 1 performed by the face registration unit 1. The target registration processing 1 is initiated when an image including a face as a target is input by a user.

In step S1, the image acquisition section 21 acquires a plurality of images and a registration ID (Identification). The registration ID is identification information for identifying a target to be registered.

In step S2, the same person face image extraction section 22 extracts face images of the same person from among the images acquired by the image acquisition section 21. That is, the plurality of images is sorted by person's face image included in the plurality of images.

For the extraction of the face image, a face tracking algorithm may be used in the case of a moving image and a face clustering algorithm may be used in the case of a still image, for example. Alternatively, a user may specify the face images.

In step S3, the image clip section 41 of the face feature point detection section 23 acquires one of the extracted face images. That is, one face image is acquired from among a group of face images of the same person.

In step S4, the face feature point detection section 23 performs feature point detection processing. The feature point detection processing will be described with reference to FIG. 5.

[Feature Point Detection Processing]

Figure 5:
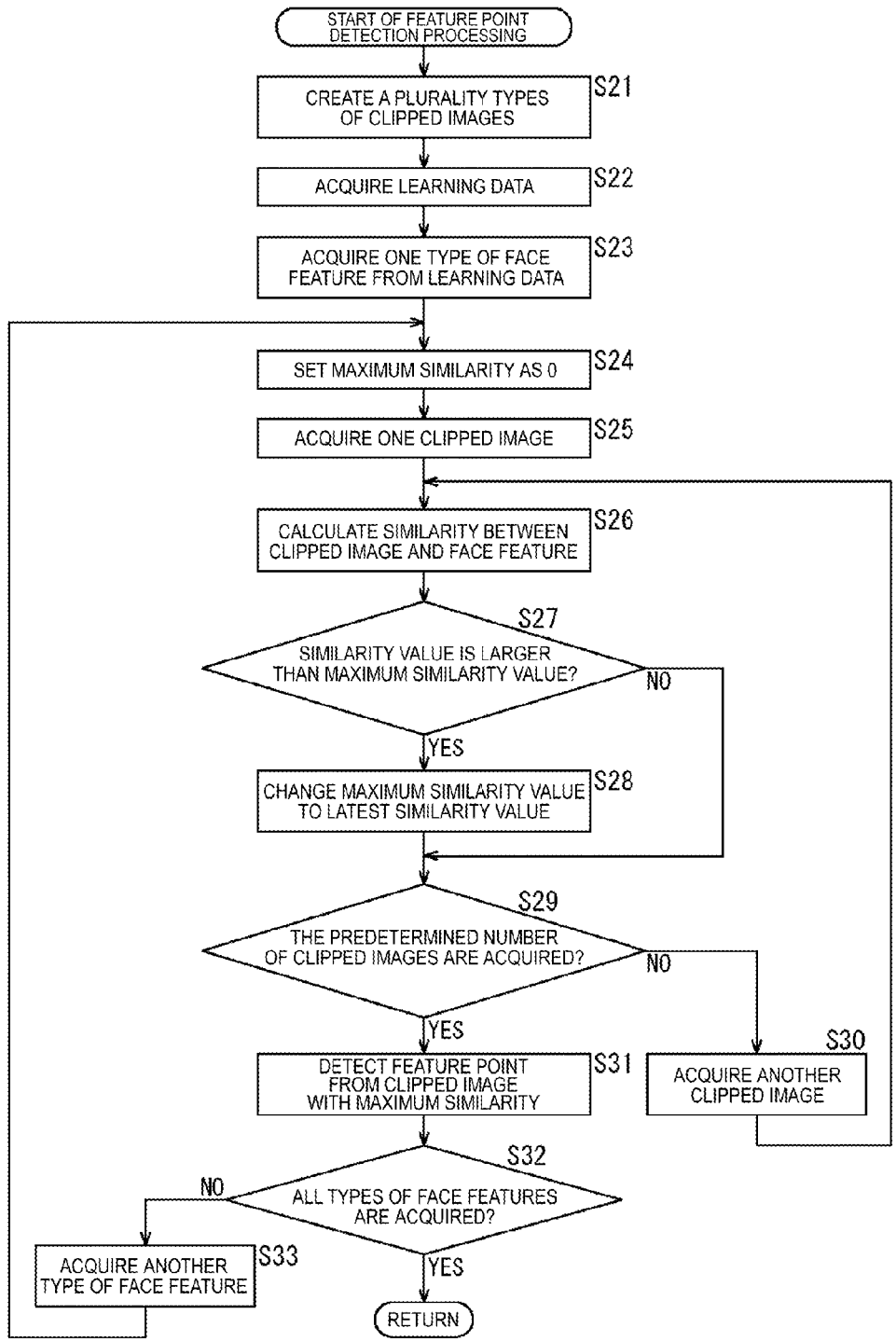
FIG. 5 is a flowchart explanatory of feature point detection processing.

FIG. 5 is a flowchart explanatory of the feature point detection processing.

In step S21, the image clip section 41 creates multiple types of clip images. That is, the image clip section 41 performs raster scan on an entire region or a partial region of the acquired image to clip images of various sizes supposedly including face features (e.g., eye, nose, mouth and the like).

In step S22, the face feature determination section 42 acquires learning data from the learning database 24. In the learning database 24, learning data of the face features is previously stored.

In step S23, the face feature determination section 42 acquires one type of face feature from the learning data. For example, an eye is acquired as the face feature.

In steps S24, the face feature determination section 42 sets a maximum similarity as 0. That is, the maximum similarity is initialized.

In step S25, the face feature determination section 42 acquires one clipped image. That is, the clipped image created by the processing in step S21 is acquired.

In step S26, the face feature determination section 42 calculates similarity between the clipped image and the face feature. That is, matching is conducted on the clipped image acquired by the processing in step S25 and the face feature acquired by the processing in step S23.

In step S27, the face feature determination section 42 determines whether a value of the similarity is larger than the maximum similarity. That is, whether the value calculated by the processing in step S26 is larger than other values of the similarity is determined.

In step S27, when it is determined that the value of the similarity is larger than the value of the maximum similarity, the face feature determination section 42 changes the value of the maximum similarity to the latest value of the similarity in step S28. That is, the value of the similarity calculated in step S26 is assigned to the value of the maximum similarity.

On the other hand, when it is determined that the value of the similarity is not larger than the value of the maximum similarity in step S27, that is, when the value of the similarity calculated in step S26 is lower than or equal to the value of the maximum similarity, processing in step S28 is skipped and the process proceeds to step S29.

In step S29, the face feature determination section 42 determines whether the predetermined number of clipped images is acquired. When it is determined in step S29 that the predetermined number of clipped images is not acquired, the process proceeds to step S30.

In step S30, the face feature determination section 42 acquires another clipped image. That is, the clipped image among the clipped images created by the processing in step S21, whose similarity to the face feature of the learning data is not yet calculated, is acquired.

After performing the processing in step S30, the process returns to step S26 and the subsequent processing is repeatedly performed. That is, similar processing is performed on the other clipped images.

On the other hand, when it is determined in step S29 that the predetermined number of clipped image is acquired, the face feature determination section 42 detects feature points from the clipped image having the maximum similarity in step S31.

Figure 6:
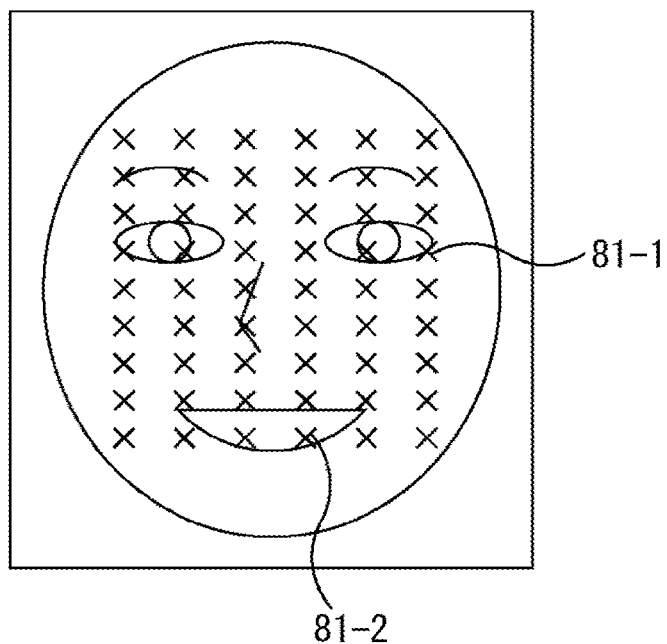
FIG. 6 is a diagram illustrating an example of feature point detection.

FIG. 6 is a diagram illustrating an example of the feature point detection. In the example of FIG. 6, the feature point is represented by a mark x. When learning data of an eye is acquired as the face feature, a feature point for identifying the eye such as a feature point 81-1 is detected.

Alternatively, when the learning data of a mouth is acquired as the face feature, a feature point for identifying the mouth such as a feature point 81-2 is detected.

After performing the processing in step S31, the face feature determination section 42 determines in step S32 whether all types of face features are acquired. When it is determined in step S32 that all types of face features are not yet acquired, the process proceeds to step S33.

In step S33, the face feature determination section 42 acquires another type of face features. A mouth, for example, is acquired as the face feature. After performing the processing in step S33, the process returns to step S24, and the subsequent processing is repeatedly performed. That is, similar processing is repeatedly performed on the other types of face features.

On the other hand, when it is determined in step S32 that all types of face features are acquired, the feature point detection processing is terminated and the process proceeds to step S5 in FIG. 4.

Referring to FIG. 4 again, the local feature quantity extraction section 25 performs feature quantity extraction processing 1 in step S5. The feature quantity extraction processing 1 will be described with reference to FIG. 7.

[Feature Quantity Extraction Processing 1]

Figure 7:
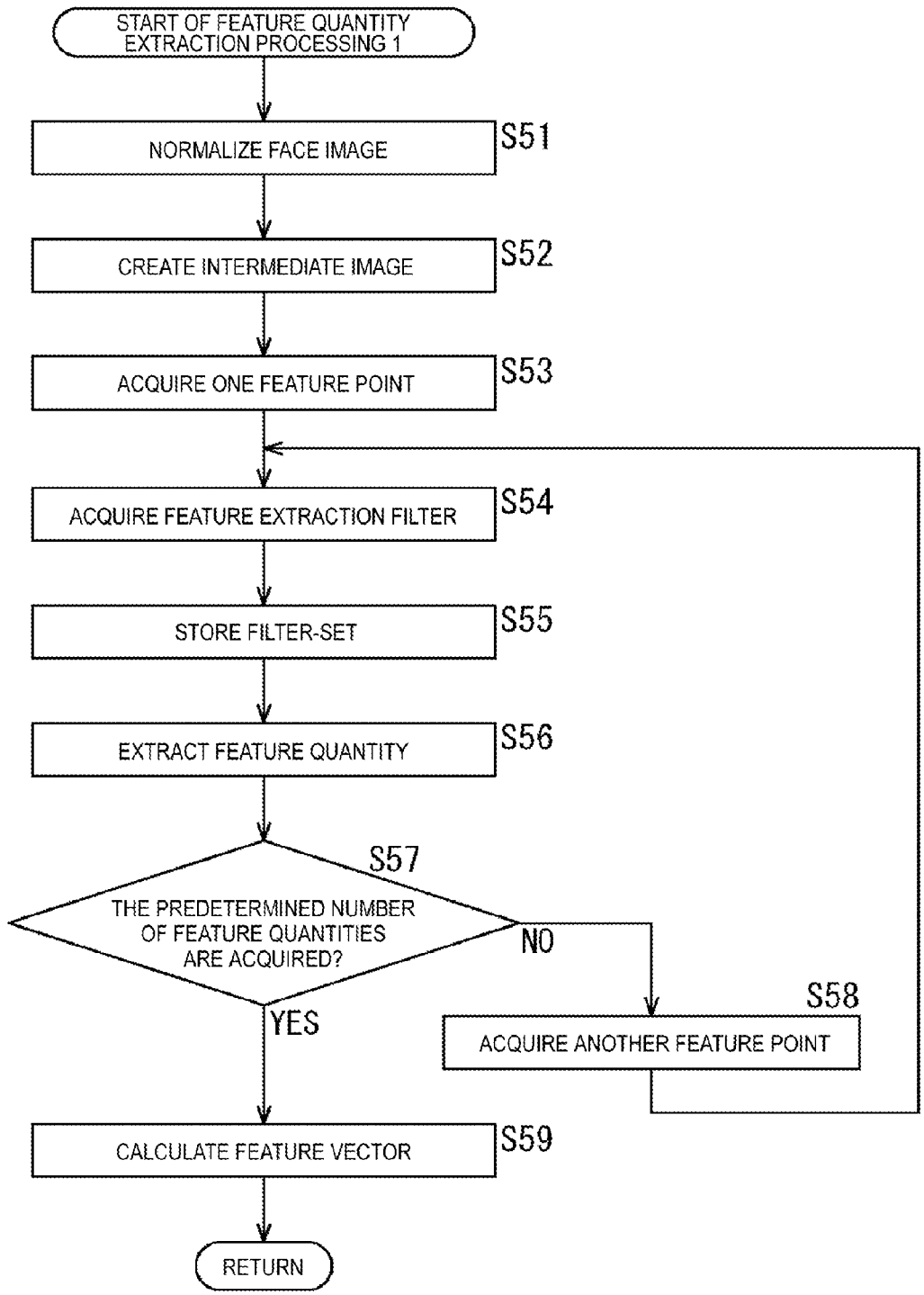
FIG. 7 is a flowchart explanatory of feature quantity extraction processing.

FIG. 7 is a flowchart explanatory of the feature quantity extraction processing 1.

In step S51, the normalization section 61 normalizes the face image. That is, a face orientation is detected by analyzing the face image and the face image is normalized such that a position of the feature point matches a reference position. In particular, affine transformation or the like is performed.

In step S52, the intermediate image creation section 62 creates an intermediate image. That is, an integral image is created from the normalized face image as the intermediate image.

The size (the number of pixels) of the intermediate image is the same as the size of the original image. A pixel value of each pixel of the intermediate image is assumed to be, when letting a predetermined position such as a top left corner of the original image among four corners be a reference position, a sum of a brightness value of each pixel of the original image included in a quadrangular range with a diagonal defined by a line linking the reference position and the position of each pixel.

In step S53, the filter-set selection section 63 acquires one feature point. That is, the one feature point is acquired at random from among the plurality of feature points detected by the feature point detection processing performed in step S4. For example, the feature point 81-1 illustrated in FIG. 6 is acquired.

In step S54, the filter-set selection section 63 acquires a feature extraction filter. The feature extraction filter is acquired at random. The feature extraction filter will be described with reference to FIG. 8.

FIGS. 8A through 8C are diagrams illustrating examples of the feature extraction filters. In FIGS. 8A through 8C, Rectangle Filters are illustrated as the feature extraction filters.

The Rectangle Filter is segmented into the predetermined number of rectangular white regions and rectangular black regions each segmented by a straight line having a gradient of 45 degrees with respect to a horizontal direction, a vertical direction or a predetermined direction.

The feature quantity extraction by using the Rectangle Filter is performed by disposing the Rectangle Filter on a predetermined position of an image and calculating a difference between a sum of brightness values of pixels included in the white region and a sum of brightness values of pixels included in the black region.

For example, 2-Rectangle Filters illustrated in FIG. 8A are suitable for extracting the feature quantity of an edge and 3-Rectangle Filters illustrated in FIG. 8B and 4-Rectangle Filters illustrated in FIG. 8C are suitable for extracting the feature quantity of a line.

The filter-set selection section 63 selects, for example, the feature point 81-1 selected at random and the feature extraction filter 91-1 selected at random as a filter-set.

Alternatively, the filter-set selection section 63 selects, for example, the feature point 81-2 selected at random and the feature extraction filter 91-2 selected at random as a filter-set.

Note that, the feature extraction filter may be a Gabor Filter, an LBP (Local Binary Pattern), a SIFT (Scale-Invariant Feature Transform) or the like other than the Rectangle Filter.

Referring to FIG. 7 again, in step S55, the filter-set selection section 63 stores the filter-set in the face identification dictionary 28. That is, a pair of the selected feature point and the selected feature extraction filter is stored in relation to each other. The stored filter-set is used in step S224 in FIG. 15 to be described later.

In step S56, the feature quantity extraction section 64 extracts the feature quantity. That is, the filter-set is applied to the intermediate image and the feature quantity corresponding to the feature point is extracted.

In step S57, the feature quantity extraction section 64 determines whether the predetermined number of feature quantities is acquired. When it is determined in steep S57 that the predetermined number of feature quantities is not acquired yet, the process proceeds to step S58.

In step S58, the filter-set selection section 63 acquires another feature point. The other feature point is acquired at random. After performing the processing in step S58, the process returns to step S54 and the subsequent processing is repeatedly performed. That is, similar processing is performed on the other feature points.

On the other hand, when it is determined in step S57 that the predetermined number of feature quantities is acquired, the feature quantity extraction section 64 calculates a feature vector in step S59. That is, the feature vector is calculated by using the extracted feature quantities as parameters.

After performing the processing in step S59, the feature quantity extraction processing 1 is terminated and the process proceeds to step S6 in FIG. 4.

In step S6 in FIG. 4, the face registration section 26 performs face registration processing. The face registration processing will be described with reference to FIG. 9.

[Face Registration Processing]

Figure 9:
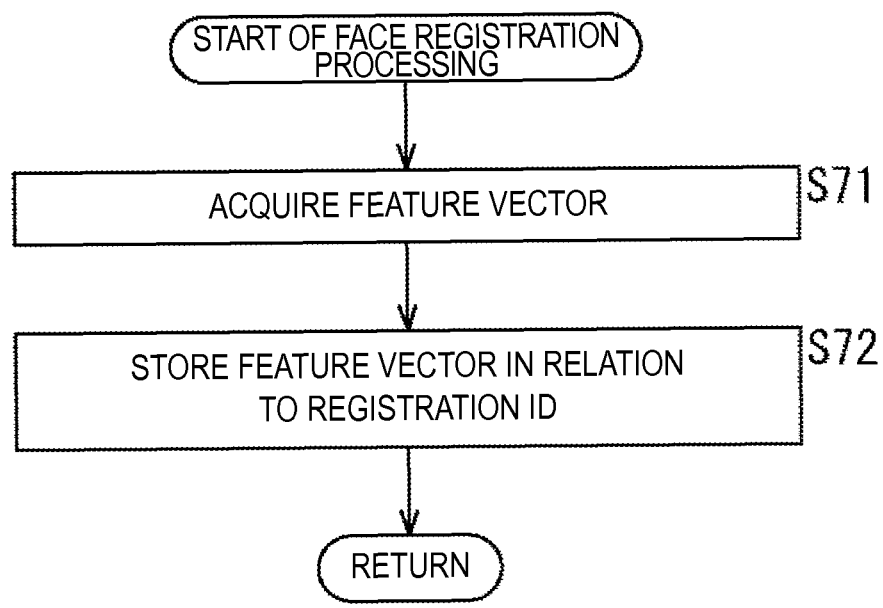
FIG. 9 is a flowchart explanatory of face registration processing.

FIG. 9 is a flowchart explanatory of the face registration processing.

In step S71, the face registration section 26 acquires the feature vector. That is, the feature vector calculated by the processing in step S59 in FIG. 7 is acquired.

In step S72, the face registration section 26 stores the registration ID acquired by the processing in step S1 in FIG. 4 and the feature vector in relation to each other in the registered face database 27. A face indicated by the feature vector is identified by relating the feature vector to the registration ID.

After performing the processing in step S72, the face registration processing is terminated and the process proceeds to step S7 in FIG. 4.

In step S7 in FIG. 4, the image clip section 41 of the face feature point detection section 23 determines whether whole face images are acquired. That is, it is determined whether the feature point detection processing, the feature quantity extraction processing 1 and the face registration processing are performed on all of the images acquired by the processing performed in step S1.

In step S7, when it is determined that all of the face images are not acquired yet, the image clip section 41 of the face feature point detection section 23 acquires another face image in step S8. After performing the processing in step S8, the process returns to step S4 and the subsequent processing is repeatedly performed. That is, similar processing is performed on other face images.

On the other hand, when it is determined in step S7 that all of the face images are acquired, the face registration processing is terminated.

As described above, the feature quantity of each of the plurality of images is extracted and stored in the registered face database 27 with information identifying the person.

Note that, though multiple images are input in the present embodiment, the number of the input images may be one.

[Configuration of Face Registration Unit]

Figure 10:
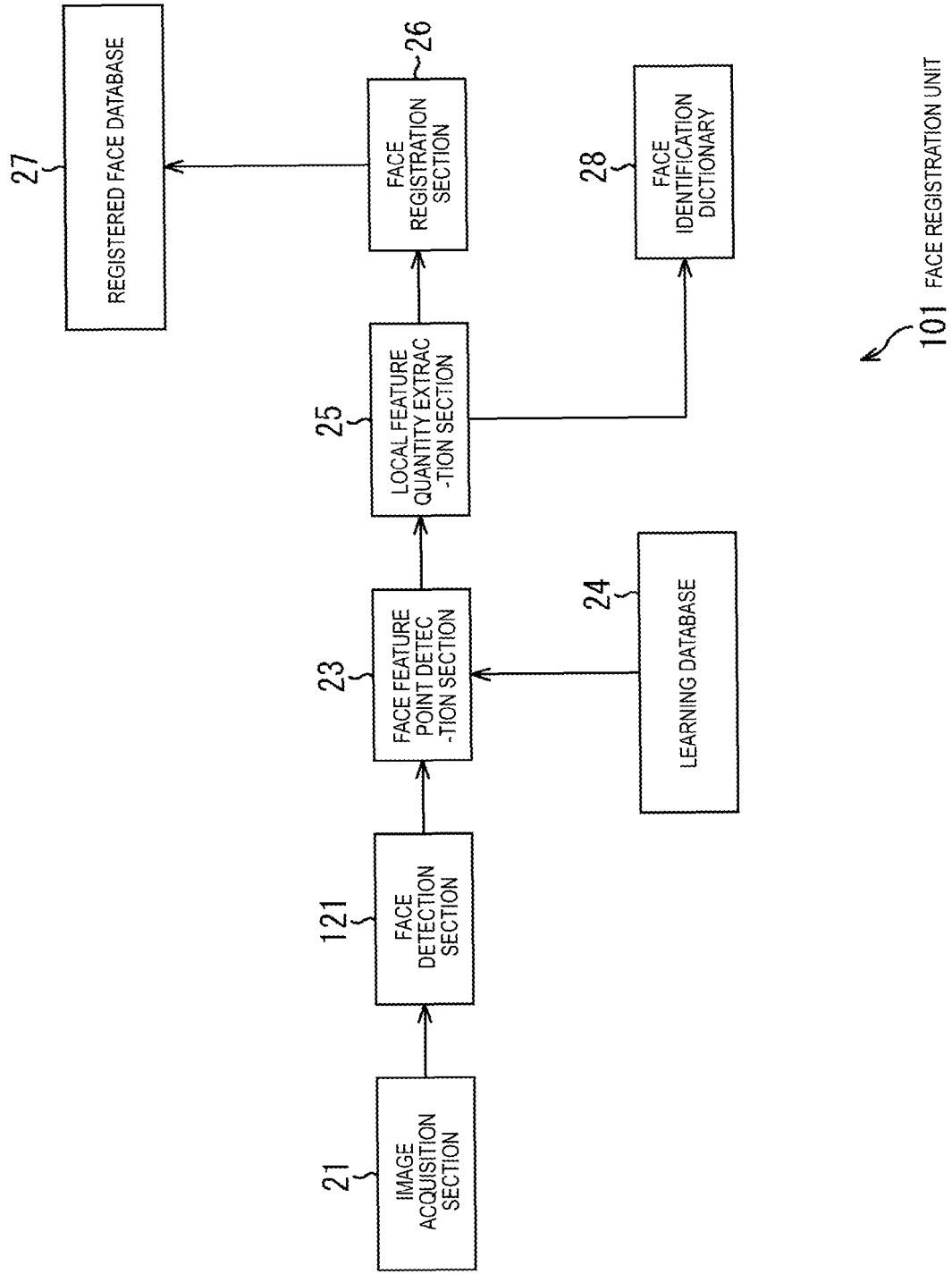
FIG. 10 is a block diagram illustrating another configuration of a face registration unit.
Figure 11:
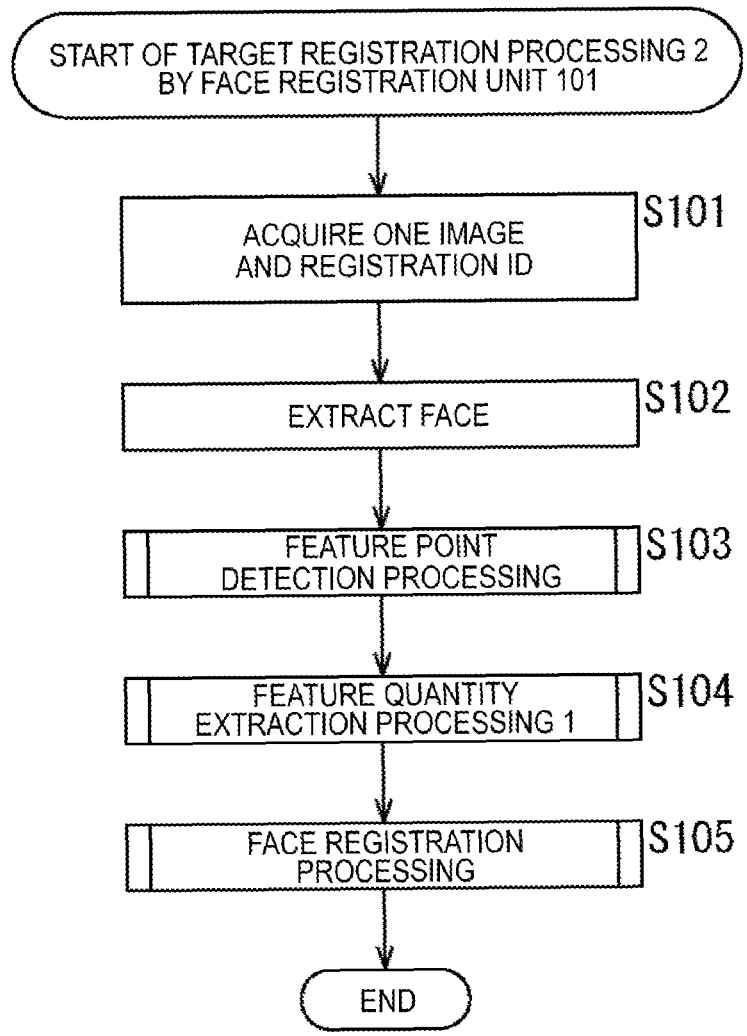
FIG. 11 is a flowchart explanatory of target registration processing.

With reference to FIG. 10 and FIG. 11, the case where one image is input will be described. FIG. 10 is a block diagram illustrating a configuration of a face registration unit 101.

In the face registration unit 101 illustrated in FIG. 10, components corresponding to those of the face registration unit 1 illustrated in FIG. 1 are denoted by the same numerals.

That is, unlike the face registration unit 1, the face registration unit 101 includes a face detection section 121 and the same person face image extraction section 22 is omitted, and other components are similar to those in the face registration unit 1. Of course, the same person face image extraction section 22 may be included.

The face detection section 121 detects a portion of a person's face included in each image supplied from the image acquisition section 21 by analyzing the image and creates a face image.

[Target Registration Processing 2]

Next, the target registration processing 2 performed by the face registration unit 101 will be described with reference to FIG. 11. FIG. 11 is a flowchart explanatory of the target registration processing 2.

In FIG. 11, the processing in steps S103 through S105 is corresponding to the processing in steps S4 through S6 in FIG. 4, respectively. Accordingly, the processing in those steps will be described briefly to reduce repetition.

In step S101, the image acquisition section 21 acquires one image and a registration ID. In step S102, the face detection section 121 detects a face from the image acquired by the image acquisition section 21. That is, the portion of the person's face included in the acquired image is detected.

In step S103, the feature point detection processing described with reference to FIG. 5 is performed. That is, feature points are detected from the face image detected by the processing in step S102.

In step S104, the feature quantity extraction processing 1 described with reference to FIG. 7 is performed. That is, feature quantities of each of the feature points detected by the processing in step S103 are extracted.

In step S105, the face registration processing described with reference to FIG. 9 is performed. That is, the registration ID acquired by the processing in step S101 and the feature quantities extracted by the processing in step S104 are registered in the registered face database 27 in relation to each other.

After performing the processing in step S105, the target registration processing 2 is terminated.

As described above, at least one feature vector is enough to be registered in relation to one registration ID in the registered face database 27.

Second Embodiment

Configuration of Recognizer Creation Unit

Figure 12:
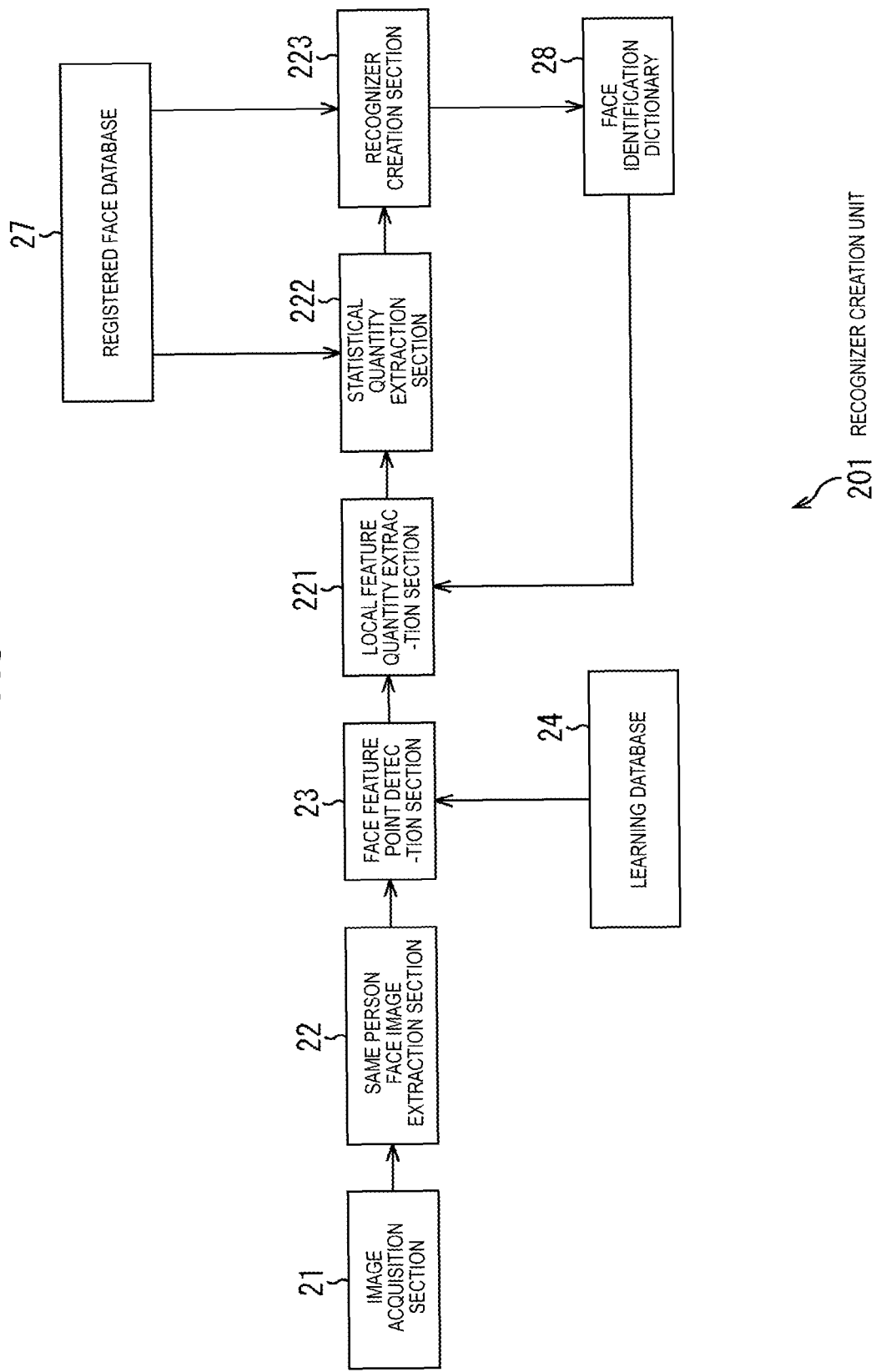
FIG. 12 is a block diagram illustrating a configuration of a recognizer creation unit.

FIG. 12 is a block diagram illustrating a configuration of a recognizer creation unit 201. In the recognizer creation unit 201 in FIG. 12, components corresponding to those in the face registration unit 1 illustrated in FIG. 1 are denoted by the same numerals.

That is, the recognizer creation unit 201 includes a local feature quantity extraction section 221, a statistical quantity extraction section 222 and a recognizer creation section 223, unlike the face registration unit 1, the local feature quantity extraction section 25 and the face registration section 26 are omitted, and other components are similar to those in the face registration unit 1.

Of course, at least one of the local feature quantity extraction section 25, the face registration section 26 and the face detection section 121 illustrated in FIG. 10 may be included in the present embodiment.

The local feature quantity extraction section 221 extracts a feature quantity of each of the detected feature points. The local feature quantity extraction section 221 will be described in detail with reference to FIG. 13.

Figure 13:
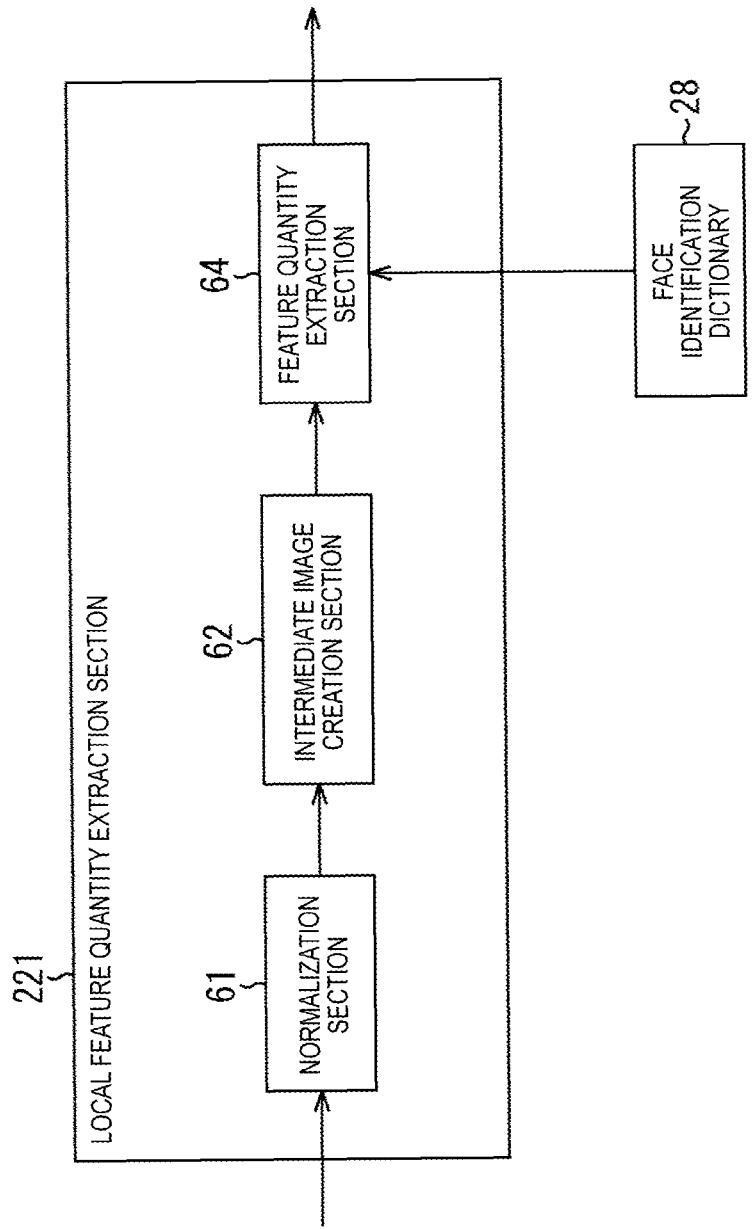
FIG. 13 is a block diagram illustrating a configuration of a local feature quantity extraction section.

FIG. 13 is a block diagram illustrating a configuration of the local feature quantity extraction section 221. In the local feature quantity extraction section 221 illustrated in FIG. 13, components corresponding to those in the local feature quantity extraction section 25 illustrated in FIG. 3 are denoted by the same numerals.

That is, unlike the local feature quantity extraction section 25, the filter-set selection section 63 is omitted from the local feature quantity extraction section 221 and other components are similar to those in the local feature quantity extraction section 25.

A feature quantity extraction section 64 of the local feature quantity extraction section 221 acquires a filter-set stored in the face identification dictionary 28.

Referring to FIG. 12 again, the statistical quantity extraction section 222 extracts statistical quantities for similarity based on the extracted feature quantities and the feature quantities previously registered in the registered face database 27.

The recognizer creation section 223 creates multiple weak recognizers for boosting processing based on the extracted statistical quantities for similarity and stores in the face identification dictionary 28 a recognizer with which the created weak recognizers are integrated.

[Face Identification Dictionary Creation Processing]

Figure 14:
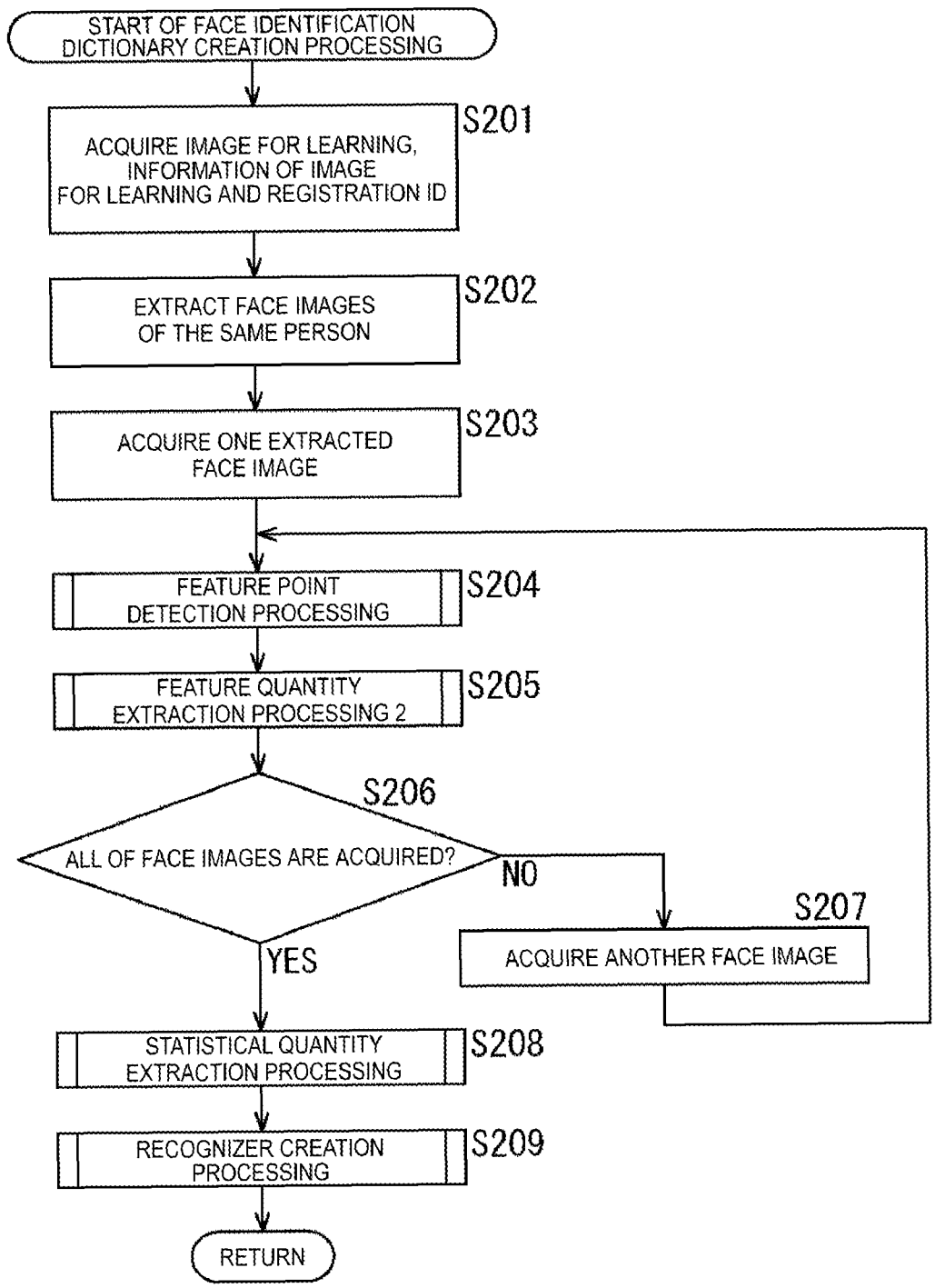
FIG. 14 is a flowchart explanatory of face identification dictionary creation processing.

The face identification dictionary creation processing will be described with reference to FIG. 14 through FIG. 18. FIG. 14 is a flowchart explanatory of the face identification dictionary creation processing.

In FIG. 14, processing in steps S202 through S204, S206 and S207 is corresponding to the processing in steps S2 through S4, S7 and S8 in FIG. 4, respectively. Accordingly, the processing in those steps will be briefly described to reduce repetition. The face identification dictionary creation processing is initiated when a user input an image for learning.

In step S201, the image acquisition section 21 acquires the image for learning, image information for learning and the registration ID. The image for learning is either a face image of a person identical with the person corresponding to the registration ID stored in the registered face database 27 or a face image of a different person.

The image information for learning is information indicating whether the image for learning is a face image of a person identical with the person corresponding to the registration ID or a face image of a different person.

In step S202, the same person face image extraction section 22 extracts a face image of the same person from the image for learning acquired by the image acquisition section 21. In step S203, the image clip section 41 of the face feature point detection section 23 acquires one of the extracted face images.

In step S204, the feature point detection processing described with reference to FIG. 5 is performed. That is, a feature point is detected from the face image acquired by the processing in step S203.

In step S205, the local feature quantity extraction section 221 performs feature quantity extraction processing 2. The feature quantity extraction processing 2 will be described with reference to FIG. 15.

[Feature Quantity Extraction Processing 2]

Figure 15:
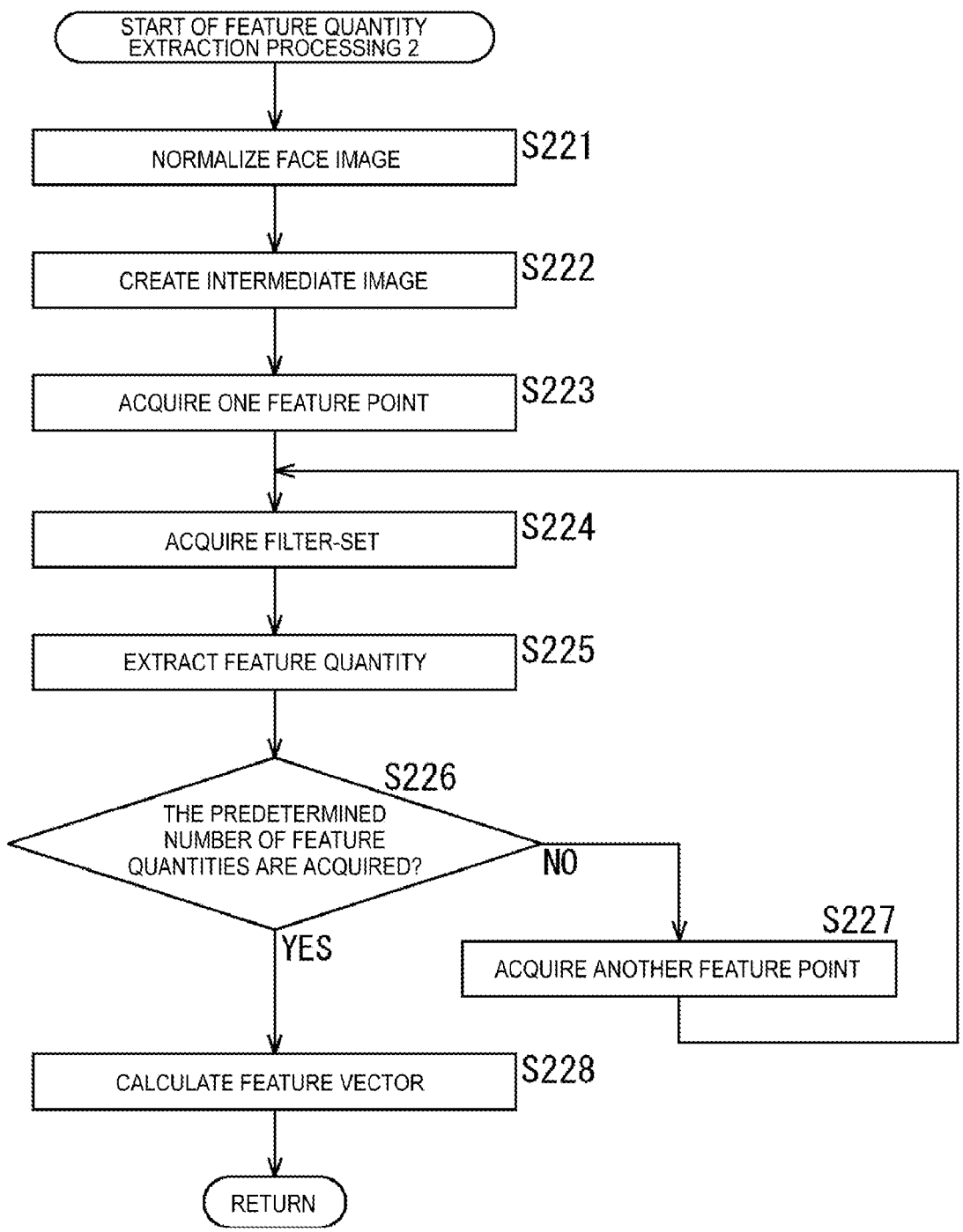
FIG. 15 is a flowchart explanatory of feature quantity extraction processing.

FIG. 15 is a flowchart explanatory of the feature quantity extraction processing 2. In FIG. 15, processing in steps S221 through S223, and S225 through S228 is corresponding to the processing in steps S51 through S53, and S56 through S59 in FIG. 7, respectively. The processing in those steps will be described briefly to reduce repetition.

In step S221, the normalization section 61 normalizes the face image. In step S222, the intermediate image creation section 62 creates an intermediate image. In step S223, the filter-set selection section 63 acquires one feature point.

In step S224, the feature quantity extraction section 64 acquires a filter-set from the face identification dictionary 28. That is, the filter-set stored in the face identification dictionary 28 by the processing in step S55 in FIG. 7 is acquired.

Figure 8:
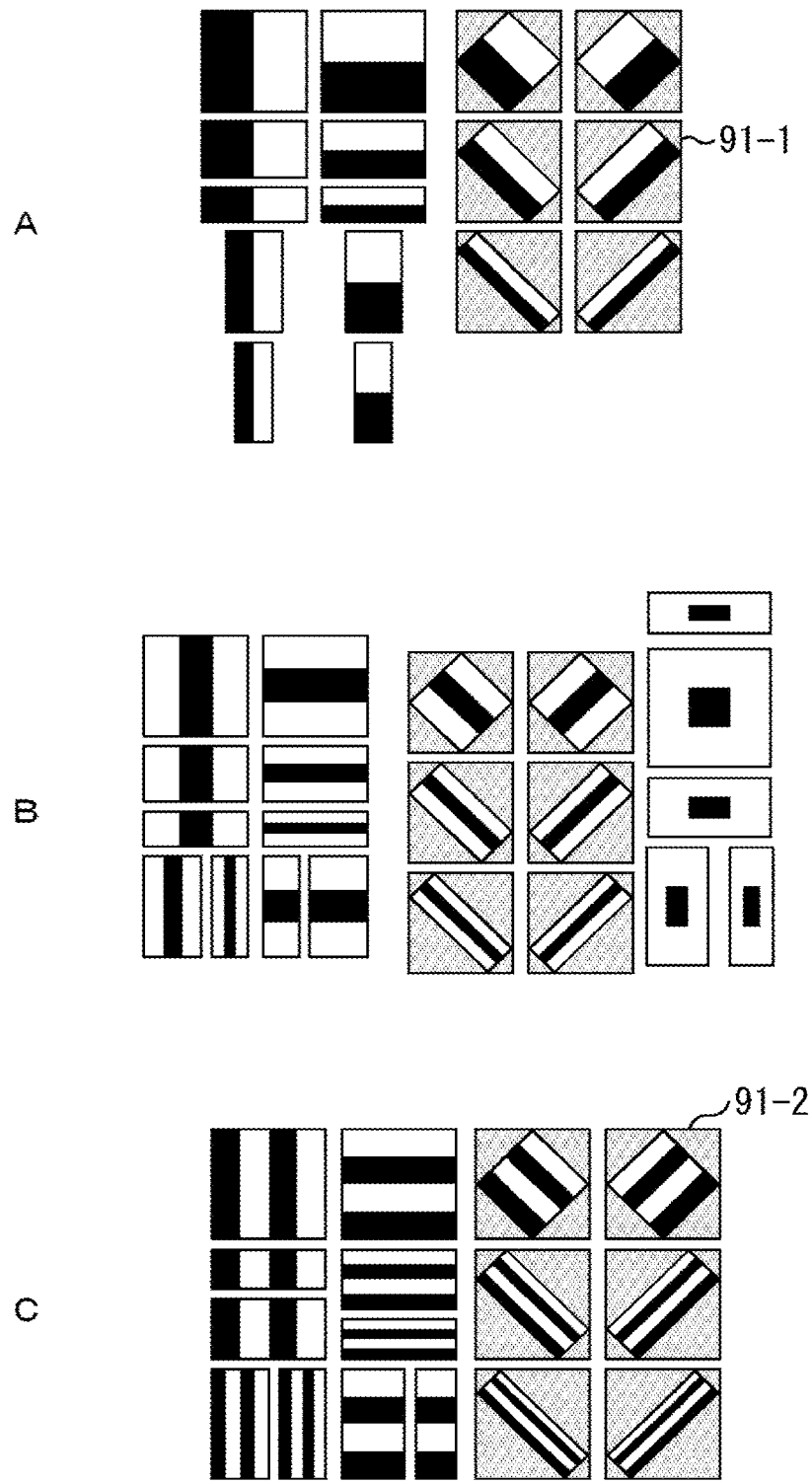
FIGS. 8A through 8C are diagrams illustrating examples of feature extraction filters.

For example, in the case where the feature point acquired by the processing in step S223 is corresponding to the feature point 81-1 illustrated in FIG. 6, the feature extraction filter 91-1 illustrated in FIG. 8 in relation to the feature point 81-1 is acquired.

In step S225, the feature quantity extraction section 64 extracts feature quantities. In step S226, the feature quantity extraction section 64 determines whether the predetermined number of feature quantities is acquired.

When it is determined in step S226 that the predetermined number of feature quantities is not acquired yet, the feature quantity extraction section 64 extracts another feature point in step S227. After performing the processing in step S227, the process returns to step S224 and the subsequent processing is repeatedly performed.

On the other hand, when it is determined in step S226 that the predetermined number of feature quantities is acquired, the feature quantity extraction section 64 calculates a feature vector in step S228. After performing the processing in step S228, the feature quantity extraction processing 2 is terminated and the process proceeds to step S206 in FIG. 14.

In step S206 in FIG. 14, the image clip section 41 of the face feature point detection section 23 determines whether all of the face images are acquired.

When it is determined in step S206 that all of the face images are not yet acquired, the image clip section 41 of the face feature point detection section 23 acquires another face image in step S207. After performing the processing in step S207, the process returns to step S204 and the subsequent processing is repeatedly performed.

On the other hand, it is determined in step S206 that all of the face images are acquired, the statistical quantity extraction section 222 performs statistical quantity extraction processing in step S208. The statistical quantity extraction processing will be described with reference to FIG. 16.

[Statistical Quantity Extraction Processing]

Figure 16:
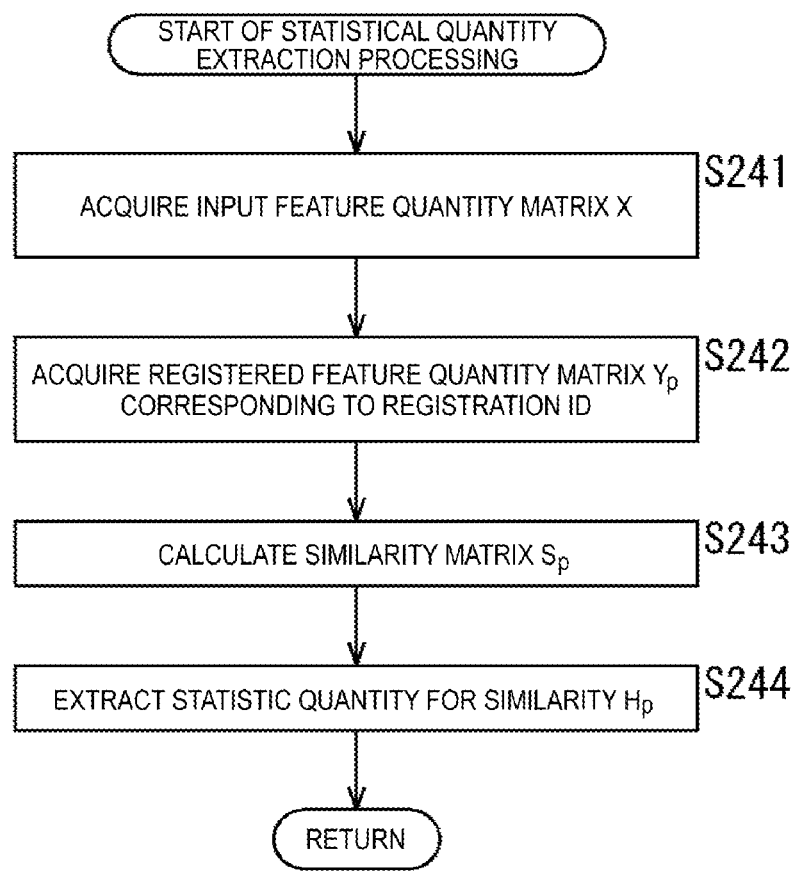
FIG. 16 is a flowchart explanatory of statistical quantity extraction processing.
Figure 17:
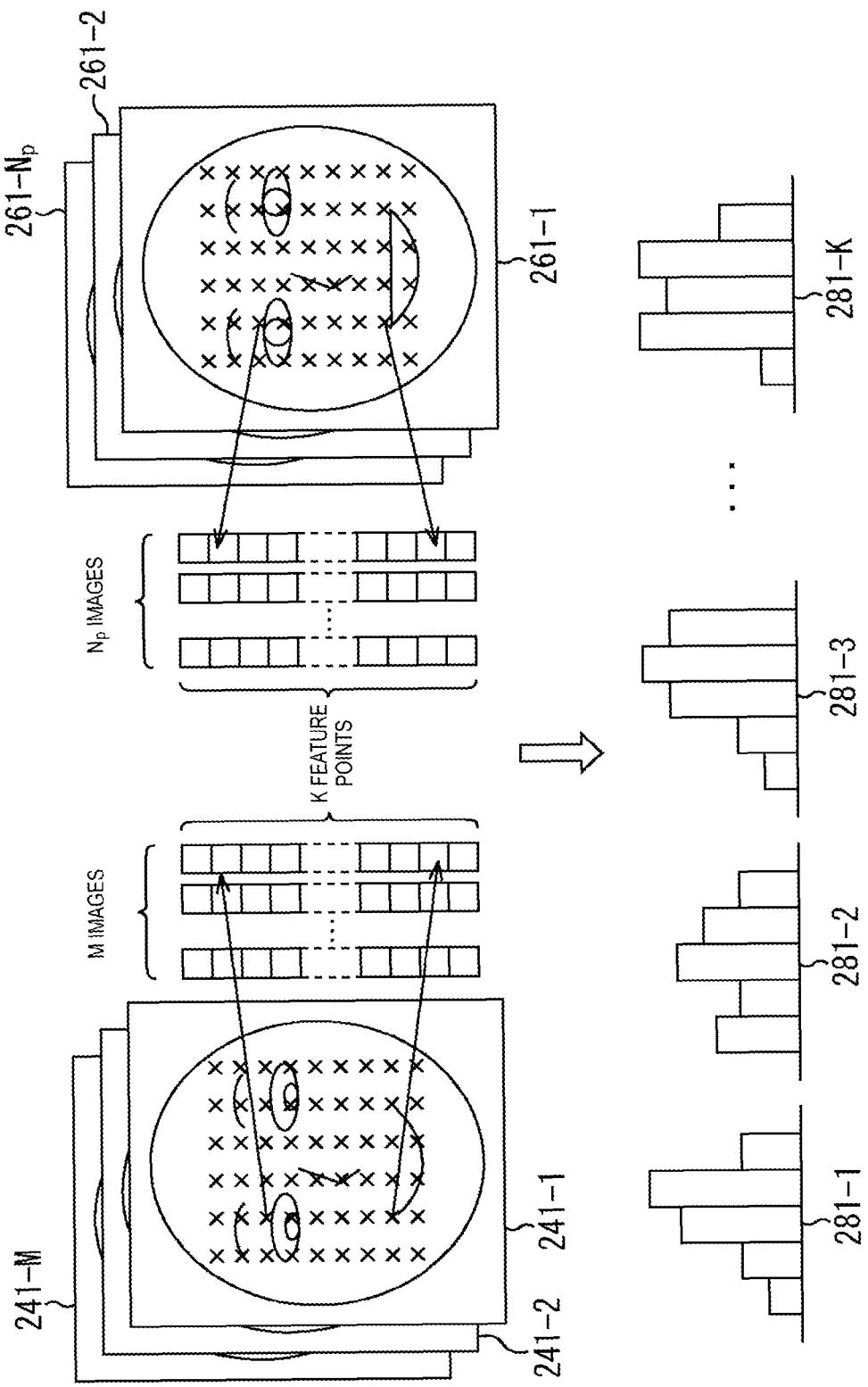
FIG. 17 is a diagram explanatory of the statistical quantity extraction processing.

FIG. 16 is a flowchart explanatory of the statistical quantity extraction processing. FIG. 17 is a diagram explanatory of the statistical quantity extraction.

In step S241, the statistical quantity extraction section 222 acquires an input feature quantity matrix X. The input feature quantity matrix X is represented by K (K is a natural number) pieces of feature quantities of each of M (M is a natural number) pieces of images as represented by the following expression (1).

[Expression 1]

$$X = (X_1 \ldots X_M) = \begin{pmatrix} x_{11} & \cdots & x_{1M} \\ \vdots & \ddots & \vdots \\ x_{K1} & \cdots & x_{KM} \end{pmatrix} \quad (1)$$

For example, the input feature quantity matrix X is acquired from feature quantities corresponding to K pieces of feature points of each of images for learning 241-1 through 241-M illustrated in FIG. 17.

In step S242, the statistical quantity extraction section 222 acquires a registered feature quantity matrix $Y_p$ corresponding to the registration ID from the registered face database 27. A character p of $Y_p$ represents information indicating a person corresponding to the registration ID.

The registered feature quantity matrix $Y_p$ is represented by K pieces of feature quantities of each of $N_p$ ($N_p$ is a natural number) pieces of the registered images as represented by the following expression (2).

[Expression 2]

$$Y_P = (Y_1^P \ldots Y_{N_P}^P) = \begin{pmatrix} y_{11}^P & \cdots & y_{1N_P}^P \\ \vdots & \ddots & \vdots \\ y_{K1}^P & \cdots & y_{KN_P}^P \end{pmatrix} \quad (2)$$

For example, the registered feature quantity matrix $Y_p$ is acquired from feature quantities corresponding to K pieces of feature points of each of the registered images 261-1 through 261-$N_p$ illustrated in FIG. 17.

Note that, it is not necessary to store all of the registered images 261-1 through 261-$N_p$ in the registered face database 27, and it is only necessary to store K pieces of feature quantities of each of the registered images 261-1 through 261-$N_p$ (that is, feature vectors of the registered images 261-1 through 261-$N_p$).

In step S243, the statistical quantity extraction section 222 calculates a similarity matrix $S_p$. The similarity matrix $S_p$ is represented by an M×$N_p$ matrix in which normalized correlation values of the input feature quantity matrix X and the registered feature quantity matrix $Y_p$ are assumed to be elements as represented by the following expression (3).

[Expression 3]

$$S_P = (S_P^1 \ldots S_P^K), S_P^k = \begin{pmatrix} s_{11}^k & \cdots & s_{1N_P}^k \\ \vdots & \ddots & \vdots \\ s_{M1}^k & \cdots & s_{MN_P}^k \end{pmatrix}, s_{mn}^k = \frac{x_{km} \cdot y_{km}}{|x_{km}||y_{km}|} \quad (3)$$

That is, similarity of each combination of the input feature quantity matrix X and the registered feature quantity matrix $Y_p$ is calculated.

In step S244, the statistical quantity extraction section 222 extracts a statistical quantity for similarity $H_p$. A various techniques may be available for the extraction of the statistical quantity for similarity $H_p$.

For example, the statistical quantity for similarity $H_p$ may be extracted as a histogram as represented by the following expression (4).

[Expression 4]

$$H_p = (h_1^p \ldots h_K^p)^T, h_k^p = \text{hist}(S_p^k) \quad (4)$$

The histograms 281-1 through 281-K are extracted as illustrated in FIG. 17, for example, based on the expression (4).

Alternatively, the statistical quantity for similarity $H_p$ may be extracted as an average value from a similarity matrix $S_p$ as represented by the following expression (5), for example.

[Expression 5]

$$H_P = (h_1^P \ldots h_K^P)^T, h_k^P = ave(S_P^k) = \frac{\sum_{m=1}^{M} \sum_{n=1}^{N_P} s_{mn}^k}{mn} \quad (5)$$

After performing the processing in step S244, the statistical quantity extraction processing is terminated and the process proceeds to step S209 in FIG. 14.

In step 209 in FIG. 14, the recognizer creation section 223 performs recognizer creation processing. The recognizer creation processing will be described with reference to FIG. 18.
[Recognizer Creation Processing]

Figure 18:
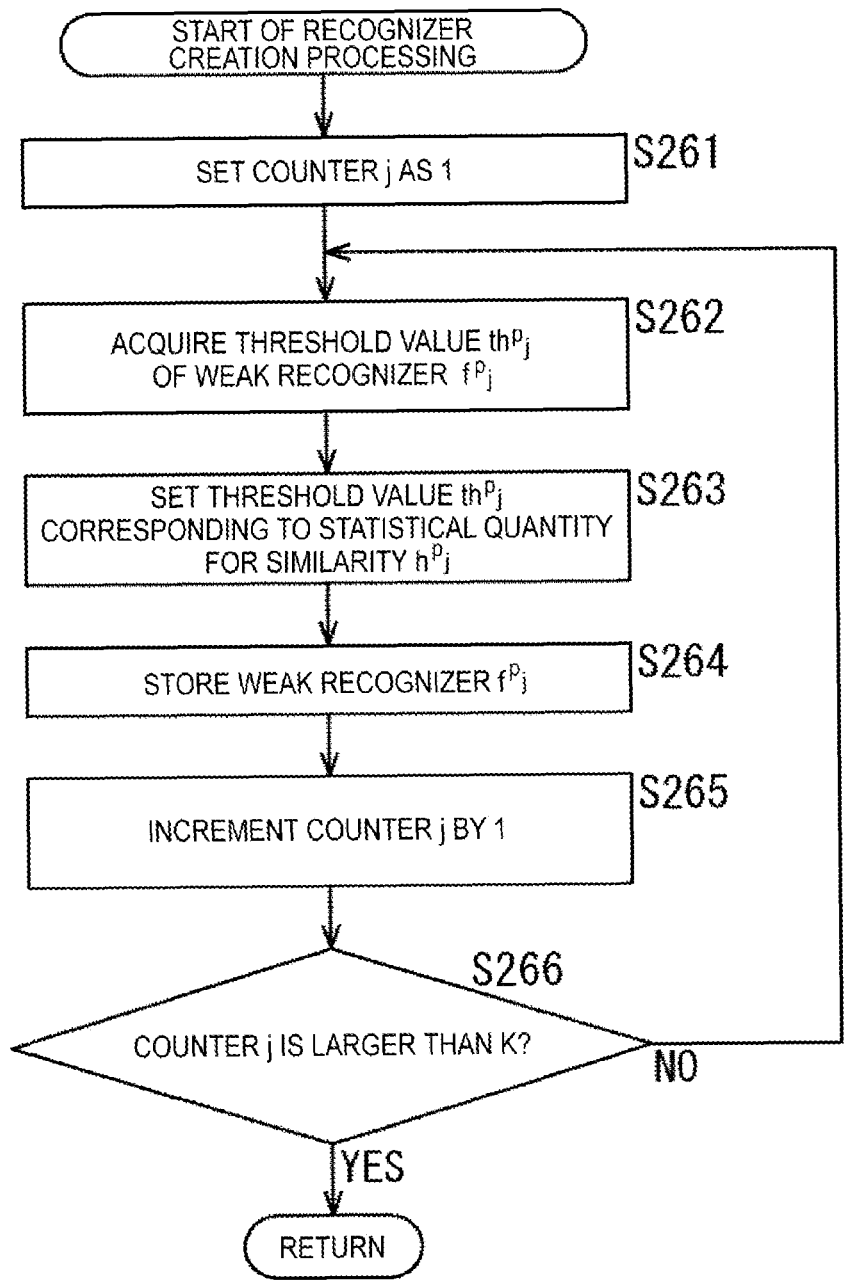
FIG. 18 is a flowchart explanatory of recognizer creation processing.

FIG. 18 is a flowchart explanatory of the recognizer creation processing.

The recognizer $R^P$ created and updated by the recognizer creation processing illustrated in FIG. 18 is composed of numerous weak recognizers $f^P$ as represented by the following expression (6).

[Expression 6]

$$R^P = \sum_{j=1}^{K} f_j^P \quad (6)$$

The weak recognizer $f^P_j$ is a function for determining whether input data and registered data indicate the same person, and the weak recognizer $f^P_j$ outputs "+1" when the determination result is equal to or higher than a threshold value $th^P_j$ (that is, the input data and the registered data indicate the same person) and outputs "−1" when the determination result is lower than the threshold value $th^P_j$.

The recognizer $R^P$ calculates a summation of outputs from the numerous weak recognizers $f^P$ and outputs the identification result.

In step S261, the recognizer creation section 223 sets a counter j as 1. That is, the counter j is initialized.

In step S262, the recognizer creation section 223 acquires the threshold values $th^P_j$ of the weak recognizers $f^P_j$. That is, each of the threshold values $th^P_j$ respectively set for the weak recognizers $f^P_j$ composing the recognizer $R^P$ is acquired.

In step S263, the recognizer creation section 223 sets the threshold value $th^P_j$ as a value corresponding to the statistical quantity for similarity $h^P_j$. That is, the threshold value $th^P_j$ is updated so as to be determined that the input data and the registered data indicate the same person or a different person based on the image information for learning acquired by the processing in step S201 in FIG. 14.

For example, when, though a person in the image for learning and a person in the registered image are the same person, the statistical quantity for similarity $h^P_j$ is lower than the threshold value $th^P_j$ to cause an output from the weak recognizer $f^P_j$ to be "−1", the output is an error. In this case, the threshold value $th^P_j$ is set such that the statistical quantity for similarity $h^P_j$ becomes equal to or higher than the threshold value $th^P_j$.

On the other hand, when, though a person in the image for learning and a person in the registered image are different persons, the statistical quantity for similarity $h^P_j$ is equal to or higher than the threshold value $th^P_j$ to cause an output from the weak recognizer $f^P_j$ to be "+1", the output is an error. In this case, the threshold value $th^P_j$ is set such that the statistical quantity for similarity $h^P_j$ becomes lower than the threshold value $th^P_j$.

In step S264, the recognizer creation section 223 stores the weak recognizers $f^P_j$. That is, the recognizer $R^P$ composed of the weak recognizers $f^P_j$ is updated.

In step S265, the recognizer creation section 223 increments a counter j by 1. In step S266, the recognizer creation section 223 determines whether a value of the counter j is larger than K.

When it is determined that the value of the counter j is not larger than K in step S266, the process returns to step S262 and the subsequent processing is repeatedly performed.

On the other hand, when it is determined that the value of the counter j is larger than K in step S266, the recognizer creation processing is terminated and the face identification dictionary creation processing illustrated in FIG. 14 is terminated.

As describe above, the similarities between all of the plurality of images for learning and all of the plurality of registered images are calculated and the recognizer for identifying the same person based on the statistical quantity extracted from the calculated similarities is created.

Third Embodiment

Configuration of Face Identification Unit

Figure 19:
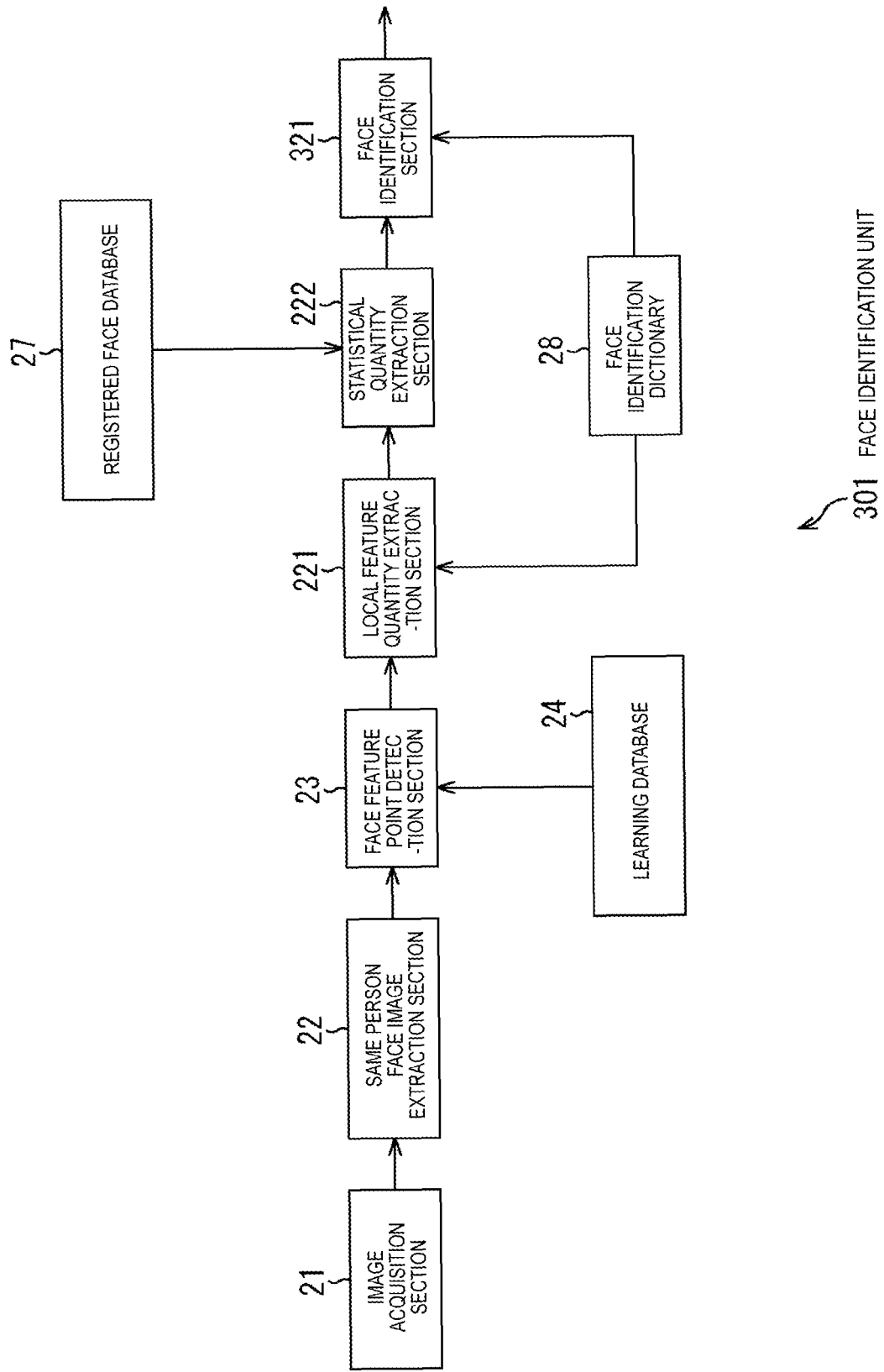
FIG. 19 is a block diagram illustrating a configuration of a face identification unit.

FIG. 19 is a block diagram illustrating a configuration of a face identification unit 301 as an information processing apparatus. In the face identification unit 301 illustrated in FIG. 19, components corresponding to those in the recognizer creation unit 201 illustrated in FIG. 12 are denoted by the same numerals.

That is, unlike the recognizer creation unit 201, the face identification unit 301 includes a face identification section 321 and the recognizer creation section 223 is omitted, and other components are similar to those in the recognizer creation unit 201.

Of course, the recognizer creation section 223 may be included in the present embodiment and further the local feature quantity extraction section 25 and the face registration section 26 illustrated in FIG. 1 may be included.

The face identification section 321 performs processing for boosting on the statistical quantity for similarity supplied from the statistical quantity extraction section 222 by using the recognizer supplied from the face identification dictionary 28 and outputs the identification result.
[Target Identification Processing 1]

Figure 20:
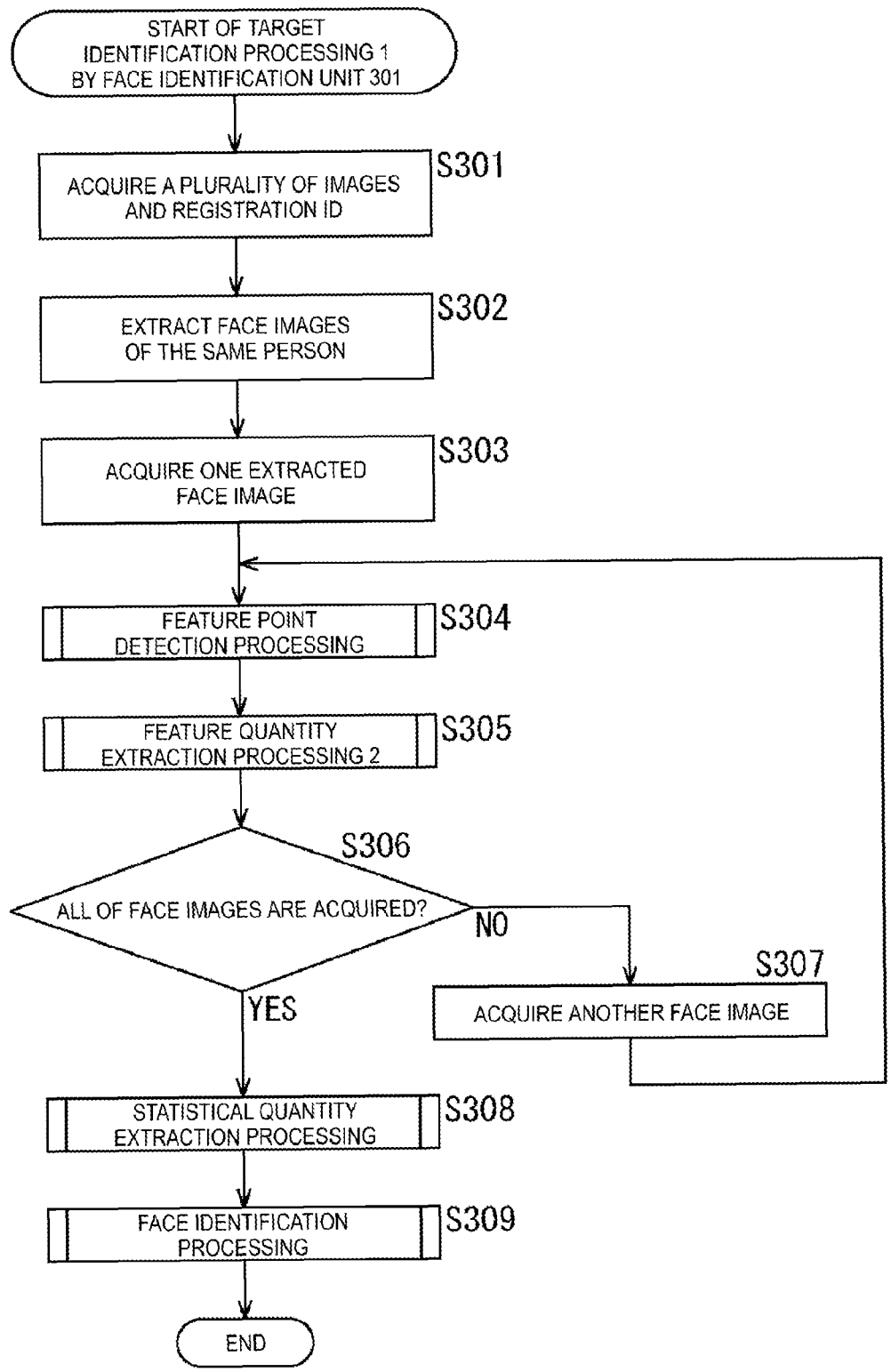
FIG. 20 is a flowchart explanatory of target identification processing.

Target identification processing 1 performed by the face identification unit 301 will be described with reference to FIG. 20 through FIG. 22. FIG. 20 is a flowchart explanatory of the target identification processing 1. FIGS. 21A and 21B are diagrams illustrating examples of face image groups.

In FIG. 20, processing in steps S302 through S308 is corresponding to the processing in steps S202 through S208 in FIG. 14, respectively. Accordingly, the processing in those steps is briefly described to reduce repetition. The target identification processing 1 is initiated when a user inputs an image.

In step S301, the image acquisition section 21 acquires a plurality of images and a registration ID. For example, M' (M' is a natural number) pieces of input images 351-1 through 351-M' are acquired as an input face image group 341 illustrated in FIG. 21A.

In step S302, the same person face image extraction section 22 extracts face images of the same person form among the plurality of images acquired by the image acquisition section 21. In step S303, the image clip section 41 of the face feature point detection section 23 acquires one of the acquired face images.

In step S304, the feature point detection processing described with reference to FIG. 5 is performed. That is, feature points are detected from the face image acquired by the processing in step S303.

In step S305, the feature quantity extraction processing 2 described with reference to FIG. 15 is performed. That is, a feature quantity of each of the feature points detected by the processing in step S304 is extracted.

In step S306, the image clip section 41 of the face feature point detection section 23 determines whether all of the face images are acquired.

When it is determined in step S306 that the all of the face images are not yet acquired, the image clip section 41 of the face feature point detection section 23 acquires another face image in step S307. After performing the processing in step S307, the process returns to step S304 and the subsequent processing is repeatedly performed.

On the other hand, when it is determined in step S306 that all of the face images are acquired, the statistical quantity extraction processing described with reference to FIG. 16 is performed in step S308.

According to this processing, an input feature quantity matrix X' corresponding to M' pieces of face images and a registered feature quantity matrix $Y_p$' corresponding to $N_p$' ($N_p$' is a natural number) pieces of registered images 371-1 through 371-$N_p$' of a registered face image group 361 illustrated in FIG. 21B are acquired. As a result, a statistical quantity for similarity $H_p$' is extracted.

In step S309, the face identification section 321 performs face identification processing. The face identification processing will be described with reference to FIG. 22.

[Face Identification Processing]

Figure 22:
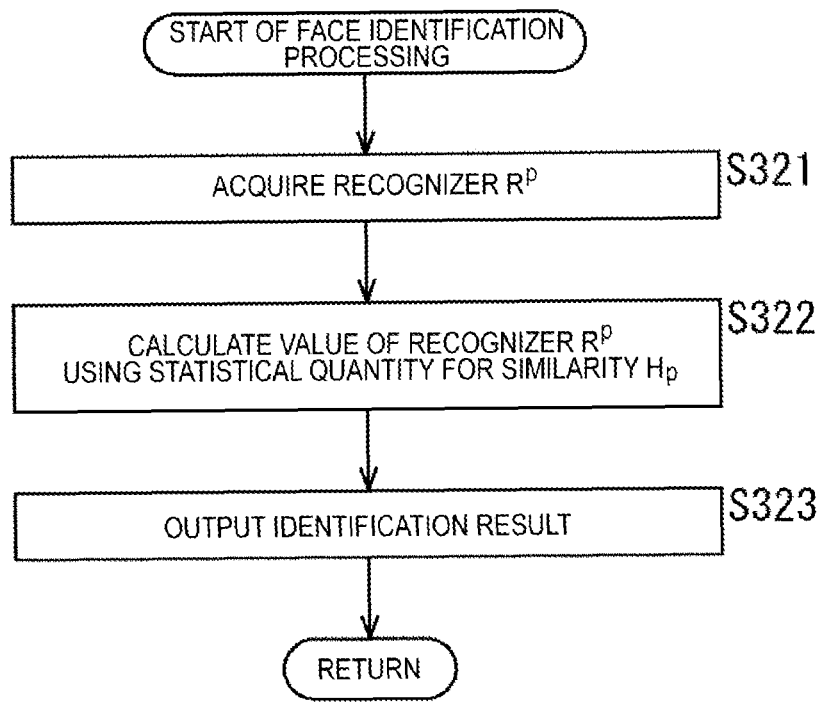
FIG. 22 is a flowchart explanatory of face identification processing.

FIG. 22 is a flowchart explanatory of the face identification processing.

In step S321, the face identification section 321 acquires a recognizer $R^p$ from the face identification dictionary 28. That is, the recognizer $R^p$ corresponding to the registration ID acquired in step S301 is acquired.

In step S322, the face identification section 321 calculates a value of the recognizer $R^p$ by using the statistical quantity for similarity $H_p$. That is, processing for boosting is performed on the statistical quantity for similarity $H_p$.

In particular, whether each statistical quantity for similarity $h^p_j$ is equal to or higher than a threshold value $th^p_j$ is determined by weak recognizers $f^p_j$ of the corresponding recognizer $R^p$ and the value of the recognizer $R^p$ is calculated by integrating the determination results (that is, by calculating a summation of the outputs from the weak recognizers $f^p_j$).

For example, processing for boosting is performed on the input face image group 341 illustrated in FIG. 21A and the statistical quantity for similarity $H_p$' extracted based on the registered face image group 361 illustrated in FIG. 21B.

In step S323, the face identification section 321 outputs an identification result. That is, whether a face included in the input face image is identical with the face of the person corresponding to the registration ID is identified and the identification result is output. For example, it is identified that whether the person in the input face image group 341 illustrated in FIG. 21A is identical to the person in the registered face image group 361 corresponding to the registration ID illustrated in FIG. 21B.

In particular, when the value of the recognizer $R_p$ is positive, it is identified as the same person and when the value of the recognizer $R_p$ is negative, it is identified as a different person.

After performing processing in step S323, the face identification processing is terminated and the target identification processing 1 illustrated in FIG. 20 is terminated.

As described above, the face identification processing may be performed on a plurality of input images and a plurality of registered images at once, thereby reducing processing time. Note that, the registered image may be one piece when the input images are multiple pieces.

Further, an invariant local feature quantity having resistance to an illumination change, a facial expression change, a secular change and an orientation change of a face may be selected by performing the processing for boosting on the local feature quantity, thereby enabling highly-accurate face identification having resistance to fluctuation in face.

Still further, identification accuracy is improved because the face identification processing is performed by reflecting similarity between all of the plurality of input images and all of the plurality of registered images. Relation between, the numbers of input images and registered images, and identification performance will be described with reference to FIG. 23.

Figure 23:
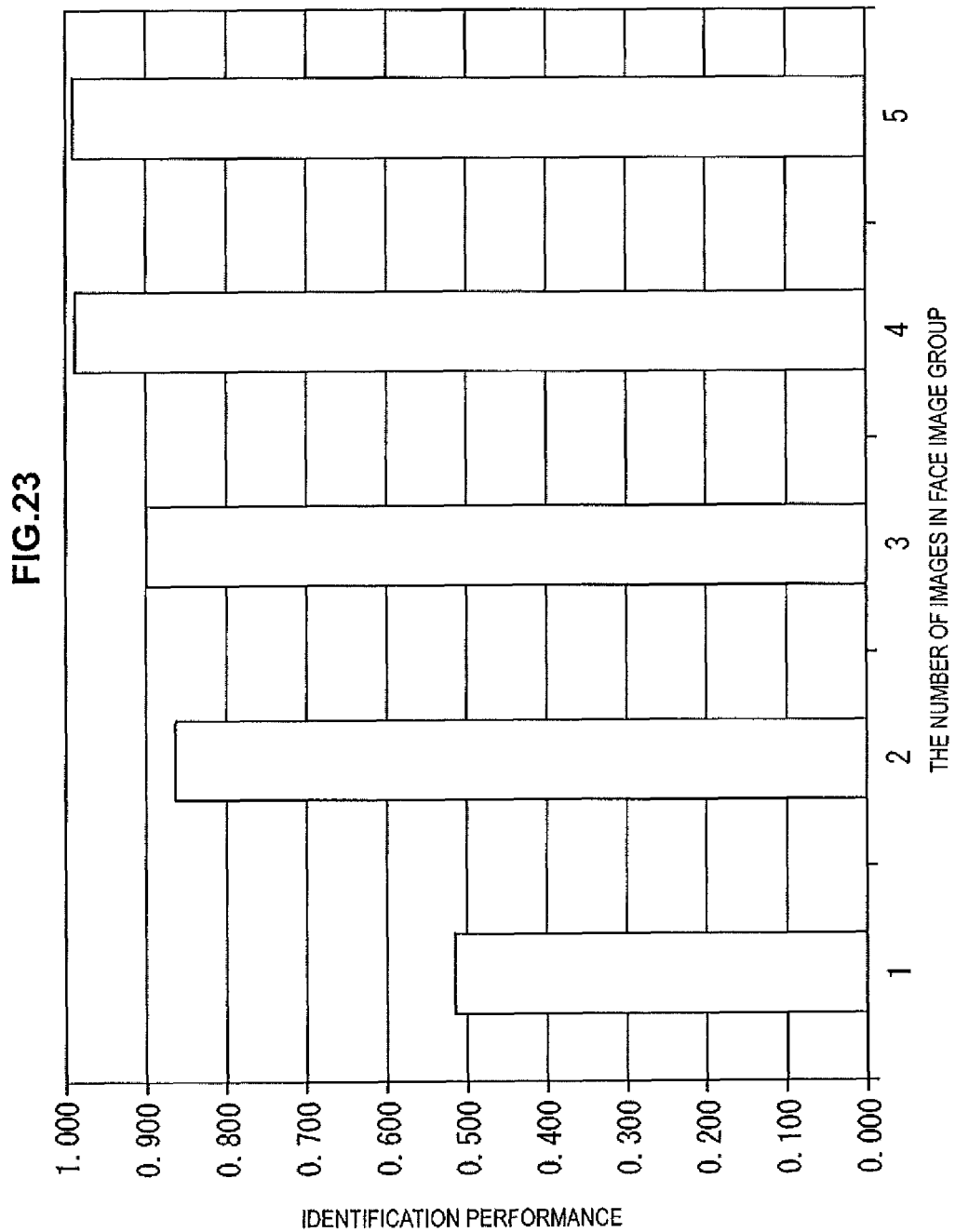
FIG. 23 is a diagram explanatory of relation between the number of images and identification performance.

FIG. 23 is a diagram explanatory of the relation between, the numbers of input images and registered images, and identification performance. In FIG. 23, a horizontal axis represents the number of images included in the face image group and a vertical axis represents the identification performance. For simplicity, the number of input images and the number of registered images are assumed to be the same.

As illustrated in FIG. 23, in comparison with the identification performance in one piece of the input image and one piece of the registered image, the identification performance improves with increase in the number of input images and the number of registered images.

Note that, though the number of the input images is more than one in the present embodiment, the number of the input image may be one.

[Configuration of Face Identification Unit]

Figure 24:
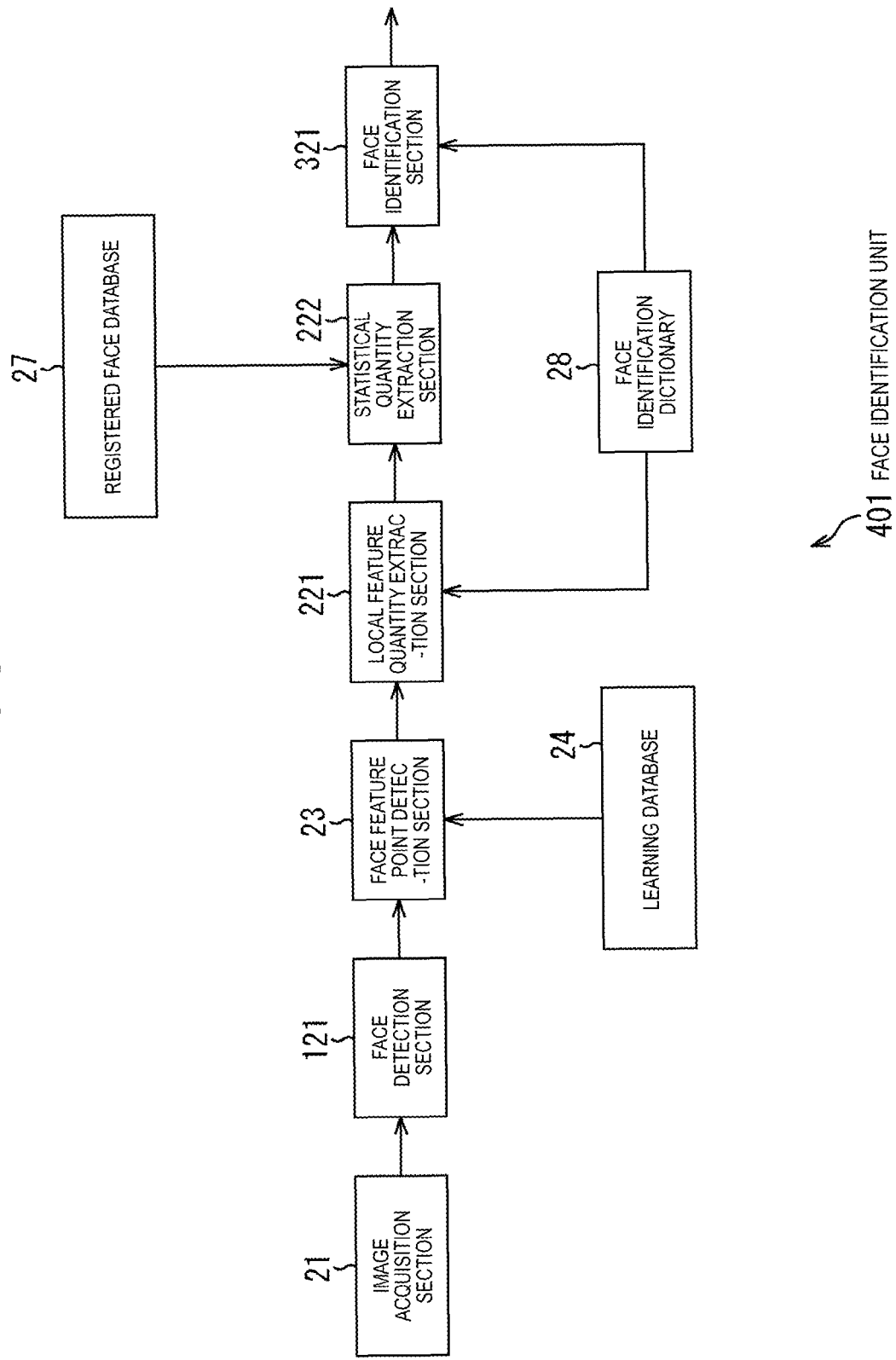
FIG. 24 is a block diagram illustrating another configuration of a face identification unit.

The case where the number of the input images is one will be described with reference to FIG. 24 and FIG. 25. FIG. 24 is a block diagram illustrating a configuration of a face identification unit 401.

In the face identification unit 401 illustrated in FIG. 24, components corresponding to those in the face registration unit 101 illustrated in FIG. 10 and the face identification unit 301 illustrated in FIG. 19 are denoted by the same numerals.

That is, unlike the face identification unit 301, the face identification unit 401 includes a face detection section 121 and the same person face image extraction section 22 is omitted and other components are similar to those in the face identification unit 301. Of course, the same person face image extraction section 22 may be included.

[Target Identification Processing 2]

Target identification processing 2 performed by the face identification unit 401 will be described with reference to FIG. 25.

Figure 25:
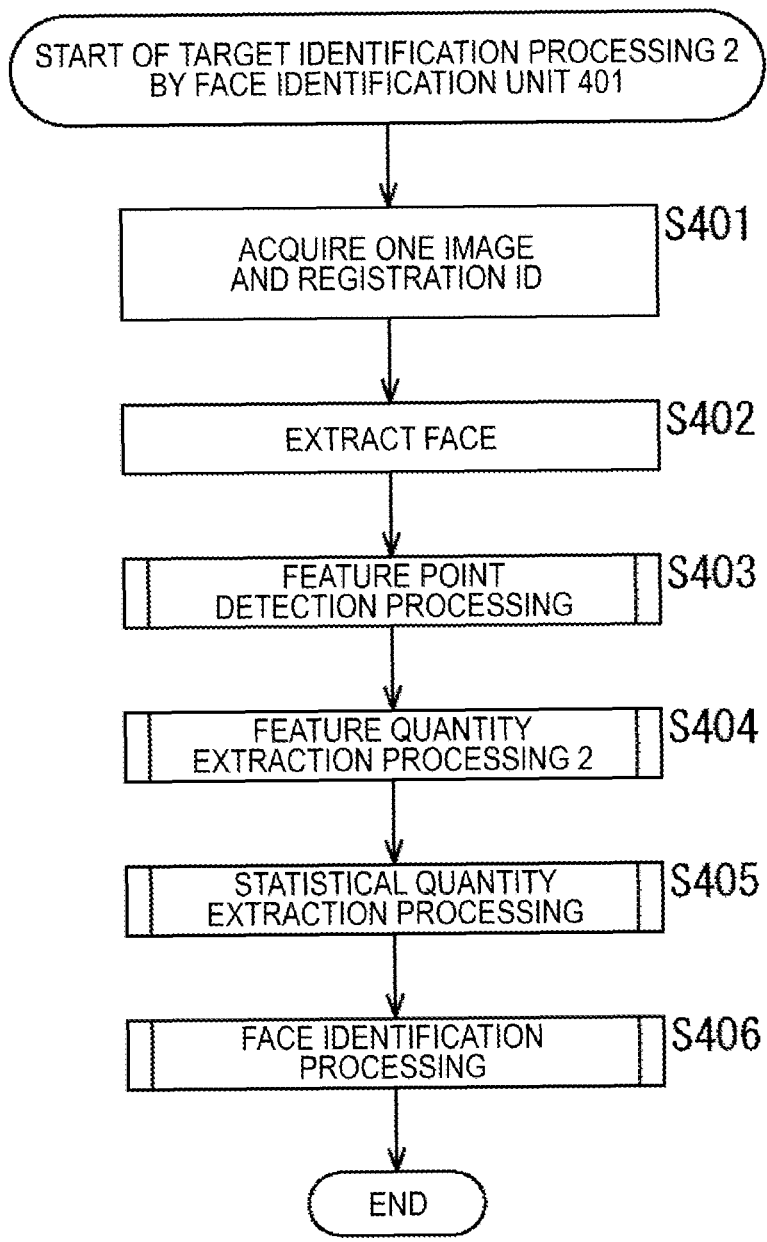
FIG. 25 is a flowchart explanatory of target identification processing.

Processing in steps S401 through S403 in FIG. 25 is corresponding to the processing in steps S101 through S103 in FIG. 11, respectively, and processing in steps S404 through S406 is corresponding to the processing in steps S305, S308 and S309 in FIG. 20, respectively. Accordingly, the processing in those steps is briefly described to reduce repetition.

In step S401, the image acquisition section 21 acquires one image and a registration ID. In step S402, the face detection section 121 detects a face from the image acquired by the image acquisition section 21. That is, a portion of a person's face included in the acquired image is detected.

In step S403, the feature point detection processing described with reference to FIG. 5 is performed. That is, feature points are detected from the image of the face detected by the processing in step S402.

In step S404, the feature quantity extraction processing 2 described with reference to FIG. 15 is performed. That is, the feature quantity of each of the feature points detected by the processing in step S403 is extracted.

In step S405, the statistical quantity extraction processing described with reference to FIG. 16 is performed. That is, an input feature quantity matrix X based on the feature quantity extracted by the processing in step S404 and the registered feature quantity matrix $Y_p$ registered in the registered face database 27 are acquired. As a result, a statistical quantity for similarity $H_p$ is extracted.

In step S406, the face identification processing described with reference to FIG. 22 is performed. That is, processing for boosting by using the recognizer $R^p$ stored in the face identification dictionary 28 is performed on the statistical quantity for similarity $H_p$ extracted by the processing in step S405 and the face is identified.

After performing the processing in step S406, the target identification processing 2 is terminated.

As described above, the processing for identifying a face by using one input image and a plurality of registered images may be performed.

[Configuration of Personal Computer]

FIG. 26 is a block diagram illustrating an example of a hardware configuration of a personal computer 501 performing the above-described series of processes by using a program.

In the personal computer 501, a CPU (Central Processing Unit) 521, a ROM (Read Only Memory) 522 and a RAM (Random Access Memory) are mutually connected by a bus 524.

Further, an input-output interface 525 is connected to the bus 524. An input section 526, an output section 527, a storage section 528, a communication section 529 and a drive 530 are connected to the input-output interface 525.

The input section 526 includes a keyboard, a mouse, a microphone and the like. The output section 527 includes a display, a speaker and the like. The storage section 528 includes a hard disk, a nonvolatile memory and the like.

The communication section 529 includes a network interface and the like. The drive 530 drives a magnetic disk, an optical disk, a magneto optical disk and a removable media 531 such as a semiconductor memory and the like.

In the personal computer 501 as described above, the CPU 521 loads a program stored in the storage section 528, for example, in the RAM 523 via the input-output interface 525 and the bus 524 and performs the program thereby performing a variety of processes.

The program that the CPU 512 performs is recorded and provided in a removable media 531 such as a package media.

Note that, a magnetic disk (including a flexible disk), an optical disk (CD-ROM (Compact Disc-Read Only Memory), DVD (Digital Versatile Disc) and the like), a magneto optical disk, a semiconductor memory and the like are used as the package media.

Alternatively, the program may be provided via wired or wireless transmission medium such as a local area network, the Internet and digital satellite broadcasting.

In the personal computer 501, the program may be installed in the storage section 528 via the input-output interface by loading the removable media 531 in the drive 530.

Alternatively, the program may be installed in the storage section 528 by receiving the program at the communication section 529 via the wired or wireless transmission medium. Further, the program may be previously installed in the ROM 522 or the storage section 528.

Note that, the program that the personal computer 501 performs may be the program performed chronologically along the description order of the present specification, or the program performed in parallel or when necessary such as when getting called.

[Others]

Embodiments of the present technology are not limited to the above-described embodiments but various modifications may occur insofar as they are within the scope of the present technology. Further, in the embodiments of the present technology, a part of functions may be included in another device.

Note that, in the embodiments of the present technology, cases are described where the identification target is a face, but the identification target may be other than the face. The identification target may be a hand, an animal, an object and the like.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus comprising:

a statistical quantity extraction section calculating similarities between all of a group of multiple images of a first identification target and all of a group of multiple images of a second identification target and extracting a statistical quantity for similarity from the similarities; and an identification section identifying the first identification target with the second identification target based on the statistical quantity for similarity.

(2) The information processing apparatus according to (1), further comprising:

a feature quantity extraction section extracting local feature quantities from the images of the first identification target and the second identification target, wherein the statistical quantity extraction section calculates the similarities based on the local feature quantities of the first identification target and the second identification target extracted by the feature quantity extraction section.

(3) The information processing apparatus according to (1) or (2), wherein the identification section identifies the first identification target with the second identification target by determining whether the statistical quantity for similarity of each combination of the first identification target and the second identification target is equal to or higher than a corresponding predetermined threshold value and by integrating the determination results.

(4) The information processing apparatus according to any one of (1) to (3), wherein the statistical quantity extraction section extracts a histogram as the statistical quantity for similarity.

(5) The information processing apparatus according to any one of (1) to (3), wherein the statistical quantity extraction section extracts an average value as the statistical quantity for similarity.

(6) The information processing apparatus according to any one of (1) to (5), wherein one of the first identification target and the second identification target is detected from one image previously registered.

(7) An information processing method comprising:

calculating similarities between all of a group of multiple images of a first identification target and all of a group of multiple images of a second identification target and extracting a statistical quantity for similarity from the similarities; and identifying the first identification target with the second identification target based on the statistical quantity for similarity.

(8) A computer readable storage medium storing a program which causes a computer:

to calculate similarities between all of a group of multiple images of a first identification target and all of a group of multiple images of a second identification target and to extract a statistical quantity for similarity from the similarities, and to identify the first identification target with the second identification target based on the statistical quantity for similarity.

(9) A program which causes a computer to calculate similarities between all of a group of multiple images of a first identification target and all of a group of multiple images of a second identification target and to extract a statistical quantity for similarity from the similarities, and to identify the first identification target with the second identification target based on the statistical quantity for similarity.

What is claimed is:

1. An information processing apparatus comprising:
one or more processors operable to:
calculate similarities between all of a group of multiple images of a first identification target and all of a group of multiple images of a second identification target and extract a statistical quantity for similarity from the similarities; and
identify the first identification target with the second identification target based on the statistical quantity for similarity,
wherein calculating the similarities comprises calculating a similarity matrix based on normalized correlation values of a first matrix and a second matrix, the first matrix including feature quantities for each of a plurality of feature points of each of the multiple images of the first identification target, and the second matrix including feature quantities for each of a plurality of feature points of each of the multiple images of the second identification target.

2. The information processing apparatus according to claim 1, wherein the one or more processors are further operable to:
extract local feature quantities from the images of the first identification target and the second identification target; and
the similarities based on the extracted local feature quantities of the first identification target and the second identification target.

3. The information processing apparatus according to claim 1, wherein the one or more processors are operable to identify the first identification target with the second identification target by determining whether the statistical quantity for similarity of each combination of the first identification target and the second identification target is equal to or higher than a corresponding predetermined threshold value and by integrating the determination results.

4. The information processing apparatus according to claim 1, wherein the one or more processors are operable to extract a histogram of the similarities as the statistical quantity for similarity.

5. The information processing apparatus according to claim 1, wherein the one or more processors are operable to extract an average value of the similarities from the similarity matrix as the statistical quantity for similarity.

6. The information processing apparatus according to claim 1, wherein one of the first identification target and the second identification target is detected from one image previously registered.

7. An information processing method comprising:
calculating similarities between all of a group of multiple images of a first identification target and all of a group of multiple images of a second identification target and extracting a statistical quantity for similarity from the similarities; and
identifying the first identification target with the second identification target based on the statistical quantity for similarity,
wherein calculating the similarities comprises calculating a similarity matrix based on normalized correlation values of a first matrix and a second matrix, the first matrix including feature quantities for each of a plurality of feature points of each of the multiple images of the first identification target, and the second matrix including feature quantities for each of a plurality of feature points of each of the multiple images of the second identification target.

8. A non-transitory computer readable storage medium storing a program which causes a computer:
to calculate similarities between all of a group of multiple images of a first identification target and all of a group of multiple images of a second identification target and to extract a statistical quantity for similarity from the similarities; and
to identify the first identification target with the second identification target based on the statistical quantity for similarity,
wherein to calculate the similarities comprises calculating a similarity matrix based on normalized correlation values of a first matrix and a second matrix, the first matrix including feature quantities for each of a plurality of feature points of each of the multiple images of the first identification target, and the second matrix including feature quantities for each of a plurality of feature points of each of the multiple images of the second identification target.

9. A non-transitory computer-readable medium having stored thereon a computer-readable program for implementing an information processing method, the method comprising:
calculating similarities between all of a group of multiple images of a first identification target and all of a group of multiple images of a second identification target and extracting a statistical quantity for similarity from the similarities; and
identifying the first identification target with the second identification target based on the statistical quantity for similarity,
wherein calculating the similarities comprises calculating a similarity matrix based on normalized correlation values of a first matrix and a second matrix, the first matrix including feature quantities for each of a plurality of feature points of each of the multiple images of the first identification target, and the second matrix including feature quantities for each of a plurality of feature points of each of the multiple images of the second identification target.

10. The information processing apparatus according to claim 1, wherein the one or more processors are further operable to:
clip all of the group of multiple images of the first identification target and all of the group of multiple images of the second identification target;
acquire a face feature from learning data; and
detect the plurality of feature points of all of the group of multiple images of the first identification target and all of the group of multiple images of the second identification target based on a maximum similarity, wherein the maximum similarity is determined by matching the clipped images of all of the group of multiple images of the first identification target and all of the group of multiple images of the second identification target with the acquired face feature.

11. The information processing apparatus according to claim 1, wherein identifying the first identification target with the second identification target comprises calculating a recognizer value by summation of outputs from a plurality of weak recognizers, wherein the outputs from the plurality of weak recognizers are based on the statistical quantity for similarity.

12. The information processing apparatus according to claim 1, wherein the first matrix is a K×M matrix representing K feature quantities for each of M images of the first identification target.

13. The information processing apparatus according to claim 1, wherein the second matrix is a K×$N_p$ matrix representing K feature quantities for each of $N_p$ images of the second identification target.

* * * * *